(12) United States Patent
Xiong et al.

(10) Patent No.: US 12,242,453 B2
(45) Date of Patent: Mar. 4, 2025

(54) DATA PROCESSING METHOD AND APPARATUS, ELECTRONIC DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventors: Liangchun Xiong, Shenzhen (CN); Anqun Pan, Shenzhen (CN); Hailin Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/450,577

(22) Filed: Aug. 16, 2023

(65) Prior Publication Data
US 2023/0394024 A1  Dec. 7, 2023

Related U.S. Application Data

(63) Continuation of application No. PCT/CN2022/125826, filed on Oct. 18, 2022.

(30) Foreign Application Priority Data

Oct. 19, 2021 (CN) .......................... 202111217539.9

(51) Int. Cl.
*G06F 16/00* (2019.01)
*G06F 16/22* (2019.01)
*G06F 16/27* (2019.01)

(52) U.S. Cl.
CPC ........ *G06F 16/2282* (2019.01); *G06F 16/278* (2019.01)

(58) Field of Classification Search
None
See application file for complete search history.

(56) References Cited

U.S. PATENT DOCUMENTS 9,836,492 B1   12/2017  Hermanson
10,157,214 B1  12/2018  Abuomar et al.
(Continued)

FOREIGN PATENT DOCUMENTS

CN   108932256 A   12/2018
CN   106415534 B    9/2019
(Continued)

OTHER PUBLICATIONS

China National Intellectual Property Administration (CNIPA) Office Action 1 for 202111217539.9 Nov. 23, 2021 15 Pages (including translation).

(Continued)

*Primary Examiner* — Hasanul Mobin
(74) *Attorney, Agent, or Firm* — Anova Law Group, PLLC

(57) ABSTRACT

A data processing method for an electronic device includes: obtaining data rebalance information representing a new partition plan for a partition table, the partition table being a table for data distribution based on a partition key; creating, for a set specified in the partition plan, a corresponding partition space, and recording, in the corresponding partition space, a current data range of a set corresponding to the partition space, the data range comprising one of a value range of the partition key and a value list of the partition key; updating the data range recorded in the corresponding partition space based on the partition plan, and updating correspondence between the corresponding partition space and sets of the partition table by using the updated data range in the corresponding partition space; and (Continued)

updating data distribution in the sets of the partition table based on the correspondence.

17 Claims, 14 Drawing Sheets

(56) References Cited

U.S. PATENT DOCUMENTS

| | | | |
|---|---|---|---|
| 10,375,164 B1* | 8/2019 | Bent | G06F 9/5077 |
| 10,387,404 B1* | 8/2019 | Gandhe | G06F 16/278 |
| 10,831,737 B2* | 11/2020 | Wang | G06F 16/2282 |
| 11,232,000 B1* | 1/2022 | Bhatia | G06F 11/1464 |
| 2012/0303581 A1* | 11/2012 | Calder | G06F 16/278 |
| | | | 707/626 |
| 2014/0164443 A1* | 6/2014 | Genc | G06F 16/278 |
| | | | 707/809 |
| 2015/0033083 A1 | 1/2015 | Ogino et al. | |
| 2016/0267162 A1* | 9/2016 | Ujibashi | G06F 16/23 |
| 2017/0052989 A1* | 2/2017 | Bensberg | G06F 16/2282 |
| 2018/0075077 A1* | 3/2018 | Wang | G06F 12/1027 |
| 2019/0236193 A1* | 8/2019 | Chen | G06F 16/24561 |
| 2019/0340260 A1 | 11/2019 | Eberlein et al. | |
| 2020/0142868 A1* | 5/2020 | Varadarajan | G06F 16/278 |
| 2021/0278983 A1 | 9/2021 | Xiao et al. | |

FOREIGN PATENT DOCUMENTS

| | | |
|---|---|---|
| CN | 111104057 A | 5/2020 |
| CN | 111767268 A | 10/2020 |
| CN | 112765262 A | 5/2021 |
| CN | 113434470 A | 9/2021 |
| CN | 113641686 A | 11/2021 |

OTHER PUBLICATIONS

The World Intellectual Property Organization (WIPO) International Search Report for PCT/CN2022/125826 Jan. 16, 2023. 13 Pages (including translation).

The European Patent Office (EPO) The Extended European Search Report for Application No. 22882828.1, Dec. 13, 2024 8 Pages.

* cited by examiner

DATA PROCESSING METHOD AND APPARATUS, ELECTRONIC DEVICE, STORAGE MEDIUM, AND PROGRAM PRODUCT

RELATED APPLICATIONS

This application is a continuation application of PCT Patent Application No. PCT/CN2022/125826, filed on Oct. 18, 2022, which claims priority to Chinese Patent Application No. 202111217539.9, entitled "DATA PROCESSING METHOD AND APPARATUS, ELECTRONIC DEVICE, STORAGE MEDIUM, AND PROGRAM PRODUCT" filed with the China Patent Office on Oct. 19, 2021, content of all of which is incorporated by reference in its entirety.

FIELD OF TECHNOLOGY

This disclosure relates to the field of data processing and database technologies and, in particular, to a data processing method and apparatus, an electronic device, a computer-readable storage medium, and a computer program product.

BACKGROUND

In a distributed database, data of a large table can be divided into multiple small subsets called sets through a partition table. Based on the distribution of data, the partition table can be divided into three types: range, list, and hash.

In response to changes in data distribution rules, stored data needs to be rebalanced. In the related art, data rebalance is generally completed by copying a partition table that needs to participate in rebalance, and synchronizing data in the copied table based on new data distribution rules. However, such method requires additional storage space to store a full amount of data, and the execution time of data rebalance is long, which may easily cause service congestion.

SUMMARY

Embodiments of this disclosure provide a data processing method and apparatus, an electronic device, a computer-readable storage medium, and a computer program product, which help to solve the problem that execution of data rebalance occupies large storage space, and takes a long time, causing service congestion.

According to an aspect of this disclosure, a data processing method is provided for an electronic device. The method includes: obtaining data rebalance information representing a new partition plan for a partition table, the partition table being a table for data distribution based on a partition key; creating, for a set specified in the partition plan, a corresponding partition space, and recording, in the corresponding partition space, a current data range of a set corresponding to the partition space, the data range comprising one of a value range of the partition key and a value list of the partition key; updating the data range recorded in the corresponding partition space based on the partition plan, and updating correspondence between the corresponding partition space and sets of the partition table by using the updated data range in the corresponding partition space; and updating data distribution in the sets of the partition table based on the correspondence.

According to another aspect of this disclosure, an electronic device is provided. The electronic device includes a memory storing one or more computer programs having executable computer instructions, and at least one processor coupled to the memory. The processor is configured to execute the executable computer instructions to perform: obtaining data rebalance information representing a new partition plan for a partition table, the partition table being a table for data distribution based on a partition key; creating, for a set specified in the partition plan, a corresponding partition space, and recording, in the corresponding partition space, a current data range of a set corresponding to the partition space, the data range comprising one of a value range of the partition key and a value list of the partition key; updating the data range recorded in the corresponding partition space based on the partition plan, and updating correspondence between the corresponding partition space and sets of the partition table by using the updated data range in the corresponding partition space; and updating data distribution in the sets of the partition table based on the correspondence.

According to another aspect of this disclosure, a non-transitory computer-readable storage medium is provided. The non-transitory computer-readable storage medium stores computer program instructions executable by at least one processor to perform: obtaining data rebalance information representing a new partition plan for a partition table, the partition table being a table for data distribution based on a partition key; creating, for a set specified in the partition plan, a corresponding partition space, and recording, in the corresponding partition space, a current data range of a set corresponding to the partition space, the data range comprising one of a value range of the partition key and a value list of the partition key; updating the data range recorded in the corresponding partition space based on the partition plan, and updating correspondence between the corresponding partition space and sets of the partition table by using the updated data range in the corresponding partition space; and updating data distribution in the sets of the partition table based on the correspondence.

BRIEF DESCRIPTION OF THE DRAWINGS

To describe the technical solutions in certain embodiments of this disclosure more clearly, the following briefly describes the accompanying drawings for describing the embodiments of this disclosure.

DESCRIPTION OF EMBODIMENTS

Figure 1:
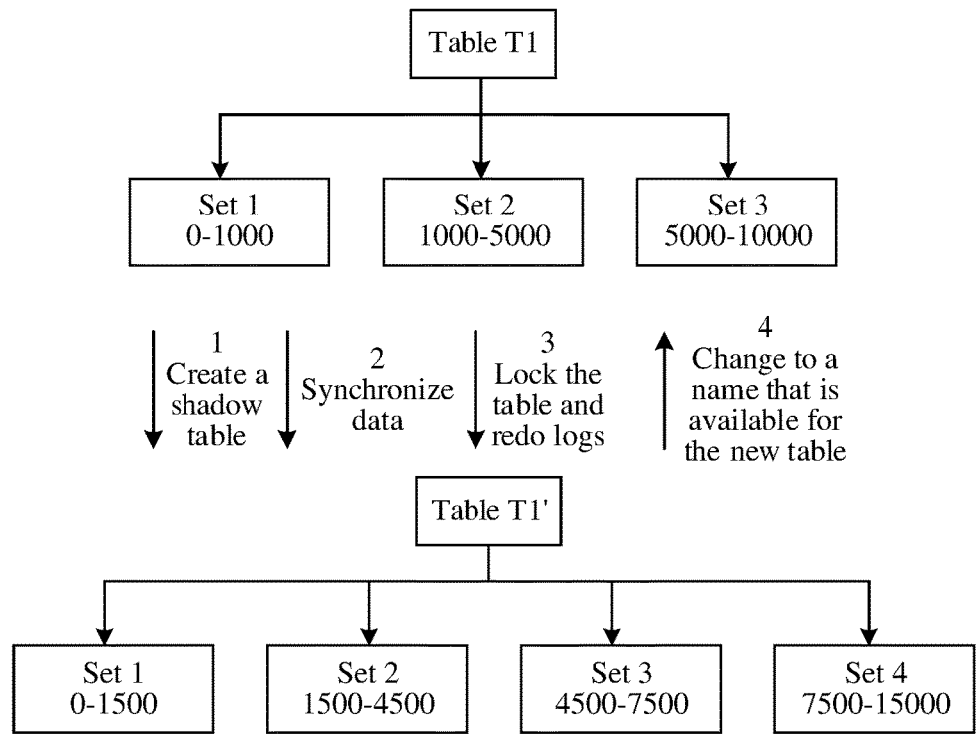
FIG. 1 is a schematic diagram of data rebalance executed for a partition table in the related art.

The following describes certain embodiments of this disclosure with reference to the accompanying drawings. It is to be understood that the embodiments described below with reference to the accompanying drawings are intended to explain technical solutions of the embodiments of this disclosure, and do not constitute any limitation on this disclosure.

A person skilled in the art may understand that, unless specifically stated, the singular forms "one", "a", "said" and "the" as used herein may also include the plural form. It is to be further understood that the terms "including" and "containing" used in the embodiments of this disclosure refer to corresponding features that can be realized as presented features, information, data, steps, operations, elements and/or assemblies, but does not exclude the implementation of other features, information, data, steps, operations, elements, assemblies and/or combinations thereof supported by the present art. It is to be understood that when we say that one component is "connected" or "coupled" to another component, the one component can be directly connected or coupled to another component, or it can mean that the one component and another component establish a connection relationship through an intermediate component. In addition, the "connection" or "coupling" used herein may include a wireless connection or a wireless coupling. The term "and/or" used herein indicates at least one of the items defined by the term, for example, "A and/or B" indicates an implementation as "A", or an implementation as "A" or an implementation as "A and B".

The terms and related technologies involved in this disclosure are described below:

A database, in short, can be regarded as an electronic file cabinet—a place to store electronic files, and users can add, query, update, delete, perform other operations on data in the files. The so-called "database" is a collection of data that is stored together in some way, can be shared with a plurality of users, has least possible redundancy, and is independent of an application.

A data management system (DBMS) is a software system designed for managing the database, generally with basic functions such as storage, interception, security assurance, and backup. The data management system can be classified according to database models supported thereby, such as relational expression and extensible markup language (XML), or be classified according to types of computers supported, such as server clusters and mobile phones, or be classified according to query language used, such as structured query language (SQL) and XQuery, or be classified according to the performance impulse focus, such as the largest scale and the highest operating speed, or be classified according to other classification methods. Regardless of the classification method used, some DBMSs are able to cross categories, for example, to support a plurality query languages at the same time.

Distributed database: a distributed database technology that combines a database technology and a distributed technology. Specifically, the distributed database technology refers to a database technology that combines data of geographically dispersed database nodes but belong to a same system in a computer system logic. The distributed database technology has both coordination between databases and distribution of data. The distributed database management system does not focus on the centralized control of a system, but on the autonomy of each database node.

A partition table: used for dividing data corresponding to a large table into a plurality of small subsets called sets. In this disclosure, the partition table may be a result of data distribution in an entire TDSQL distributed database according to certain fields (partition keys) specified by a user during establishing a certain table. Generally, according to the fields, the data distribution between nodes in a cluster includes the following ways: hash (that is, according to the partition key hash, the partition key recorded in a table is hashed to partition data of the table), range (according to a range of the partition key, the data is distributed to different cluster storage nodes), and list (that is, according to a user-specified value list, user data is distributed according to the key value distribution). In the embodiments of this disclosure, the data distribution in the two ways of range and list is involved.

Data rebalance: when a user modifies data distribution rules of a partition table, data needs to be rebalanced according to new rules, so that the data is stored in accordance with the newly distribution rules defined by the user.

Set: a smallest unit configured to actually store a certain range of data, which can be a file of an operating system, used for storing a specific range of data for a set in a table. The name in different databases may be different (which may be a file of the operating system, or a part of the range in the file).

The following describes a process of performing data rebalance for a partition table in the related art with reference to FIG. 1.

(1) Create a user-redefined temporary table structure T1' for table T1 requiring data rebalance.

(2) Synchronize data to table T1', and after synchronizing the data, redo logs.

(3) Lock the table when the logs are redone to a relatively small range and redo remaining logs.

(4) Complete renaming, release a lock, so that table T1' has become table T1 and the data has been rebalanced.

In the forgoing example, a data range of all sets has changed, but the user often does not involve the data of all sets when performing rebalance operations, and only concentrates on certain sets. Implementation of the foregoing example often requires a large enough additional storage space to store a full amount of data (or a partition storage space equivalent to participating in rebalance), and further needs to correspond to a background copy data time that a user can clearly perceive (data rebalance operation execution time). The execution time is long, and in a rebalance process, it takes time to lock the table. During this time, a service of the user is interrupted because the table is locked, resulting in user service congestion.

For at least one of the foregoing technical problems or areas requiring improvement in the related art, this disclosure provides a data processing method and apparatus, an electronic device, a computer-readable storage medium, and a computer program product. Specifically, implementations of this disclosure can achieve data rebalance by increasing partition space, which does not require additional storage space to store a full amount of data; in addition, the data rebalance of this disclosure does not require data synchronization processing on the full amount of data of the partition table, which is conducive to saving storage space, shortening execution time of data rebalance, improving efficiency of data processing, and reducing the occurrence of service congestion.

By describing several illustrative embodiments, the technical solutions of the embodiments of this disclosure and technical effects produced by the technical solutions of this disclosure are explained below. The following embodiments may be referenced, learned from or combined with each other, and the same terms, similar features, and similar implementation steps, etc., in different embodiments are not repeatedly described.

Figure 2:
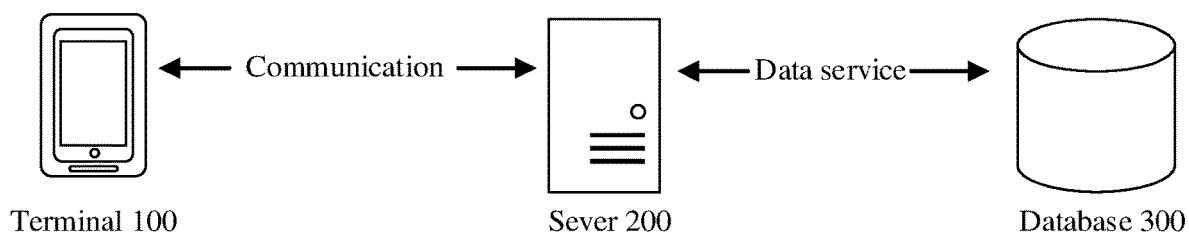
FIG. 2 is a schematic diagram of a system architecture according to an embodiment of this disclosure.

FIG. 2 is a schematic diagram of a system architecture that can apply a data processing method according to an embodiment of this disclosure. The system architecture may include a terminal 100, a server 200, and a database 300. Specifically, a user may initiate a data rebalance operation and data read and write operations through the terminal 100, the terminal 100 may communicate with the server 200 by network connection and other means, and the database 300 supports data service of the server 200. It may be understood that the database 300 in a distributed database may correspond to a plurality of databases in different geographic spaces.

Figure 3:
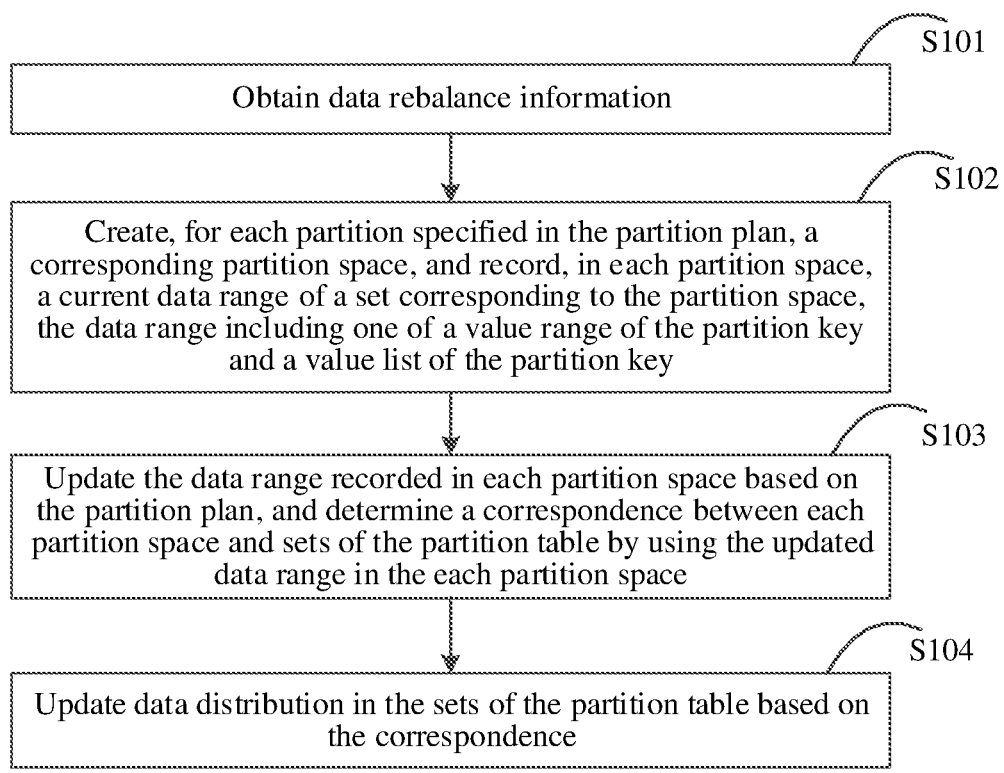
FIG. 3 is a schematic flowchart of a data processing method according to an embodiment of this disclosure.

An embodiment of this disclosure provides a data processing method which, for example, is executed in an electronic device, and the electronic device, for example, is a server 200 or a database 300. As shown in FIG. 3, the method includes the followings.

S101: Obtain data rebalance information, the data rebalance information being representing a new partition plan for a partition table, and the partition table being a table for data distribution based on a partition key. For example, the partition plan may specify a quantity of new sets and a data range of data to be stored in each set. The data range, for example, may include one of a value range of the partition key and a value list of the partition key.

The partition key may correspond to some fields of to-be-stored data. Optionally, when the partition table belongs to a range set, sets may be selected according to the value range (key value range) given when the partition key is defined, and then data is stored in corresponding sets. When the partition table belongs to a list set, the sets may be selected according to the value list given when the partition key is defined, and then the data is stored in the corresponding sets.

Data rebalance information may be obtained by parsing operation language submitted by the user, the operation language may be database definition language (DDL), and the DDL language may be used for describing real-world entities stored in the database. Optionally, the data rebalance information may include modifying, for at least one set, a value range or a value list that of the partition key thereof.

Specifically, the user may modify the value range and value list corresponding to the partition key to adjust the data stored in each set, and then achieve the data stored in a rebalanced partition table. In response to a rebalance operation triggered by the user for the partition table, the latest data rebalance information for the partition table, that is, the data rebalance rules, may be obtained.

S102: Create, for each set specified in the partition plan, a corresponding partition space, and record, in each partition space, a current data range of a set corresponding to the partition space, the data range including one of a value range of the partition key and a value list of the partition key.

Figure 4:
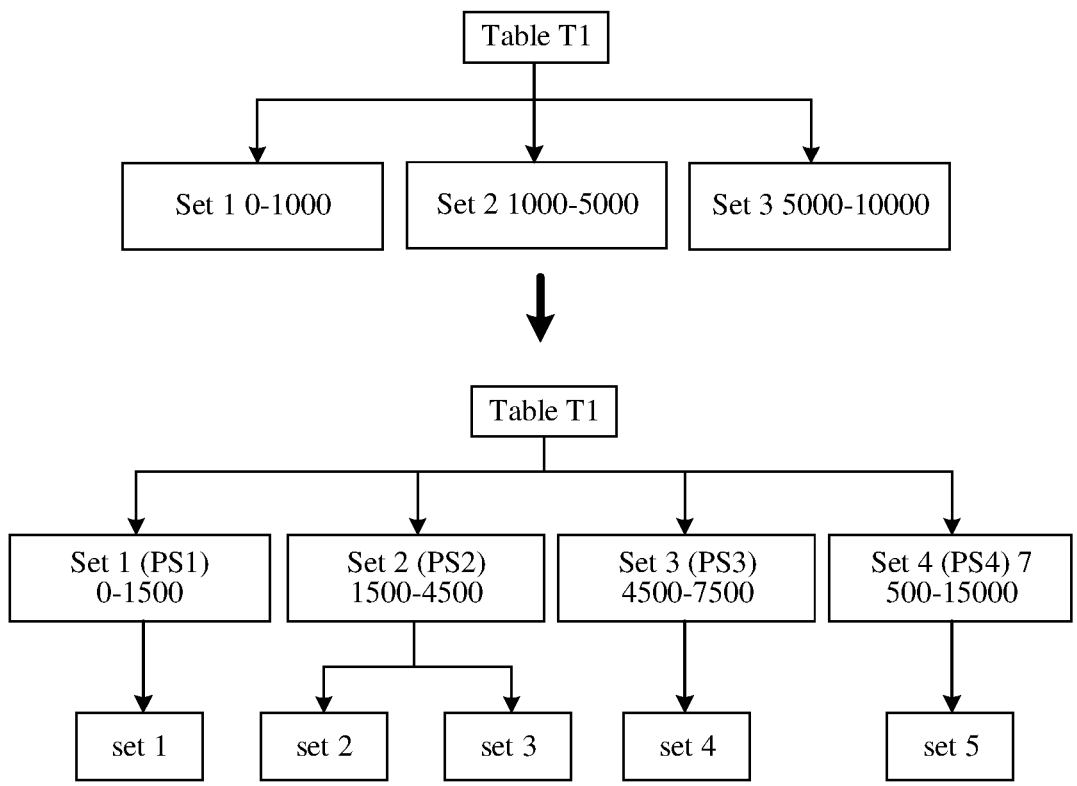
FIG. 4 is a schematic diagram of data rebalance executed for a partition table in a data processing method according to an embodiment of this disclosure.

The partition table before the data rebalance may include a two-layer management structure, as shown in FIG. 4. The first layer represents corresponding to table T1, and the second layer represents three sets, a set 1, a set 2, and a set 3, corresponding to the table 1. It may be understood that each set stores data as a data storage unit set corresponding to table 1. In other words, each set may also be referred to as the data storage unit. Different sets, for example, may be distributed across different physical storage entities. Specifically, metadata information of the partition table may record table structure of a current partition table and storage relationship of data.

Specifically, in an embodiment of this disclosure, on basis of performing data rebalance, an intermediate management structure is proposed, that is, partition space (PS). As shown in FIG. 4, a partition management layer (partition space) is added to the middle of the original two-layer management structure, and data organization structure of the partition table is also changed. A logical set range or list value (the value range or value list of the partition key) may map to a physical set by adding the partition space, that is, binding between a partition table partition definition (in the original two-layer management structure, the partition definition, for example, is stored in table T1) and data storage of an actual set is decoupled through the partition space. A data range recorded in the partition space includes one of a value range of the partition key and a value list of the partition key; that is, the data range may represent a range of data stored in each set in the partition table.

In an embodiment, in performing S102, for each current set in the partition table, a corresponding partition space is generated, and in the partition space corresponding to each set, the data range of the set is recorded. In addition, in a case that the partition plan indicates that a new set is to be created, the new set is created in S102, a corresponding partition space is generated for the new set, and in the partition space corresponding to the new set, a data range corresponding to data to be stored in the new set is recorded.

In an embodiment, partition spaces are added one by one for each set included in the original partition table in S102, that is, one set corresponds to one partition space. The partition spaces may also be added based on the data rebalance information and the data organization structure of the original partition table, and in this case, there may be situations where new sets need to be added during rebalance, and partition spaces can be correspondingly added for the added sets.

Specifically, after the partition spaces are added, the partition spaces in the partition table have a correspondence with the sets, and a range of data actually stored in the corresponding sets may be learned from the data range recorded in the partition spaces.

S103: Update the data range recorded in each partition space based on the partition plan, and determine a correspondence between each partition space and sets of the partition table by using the updated data range in the each partition space.

In an embodiment, S103 may include the following operations:
- determining a new data range of each set in the partition table based on the partition plan;
- updating, based on the new data range of each set, the data range recorded in the partition space corresponding to each set;
- determining, based on the updated data range in each partition space, data of a to-be-changed set among the sets corresponding to each partition space, and creating a new set for the data of the to-be-changed set among the sets; and
- determining a correspondence between the created set corresponding to the data of the to-be-changed set and the partition space, and determining a data range of the set corresponding to the data of the to-be-changed set.

In an embodiment, the data range is also a range definition of each set specified by the data rebalance information, which can logically be expressed as a set range and list value, and for a set, may be a value range or list value of the partition key corresponding to the set.

Since a user may modify only a definition of one or more sets in the partition table, the data rebalance information may include only the modified data range definition of the set, that is, the range of data that can be stored by the set after logical expression modification.

Specifically, since the partition space is used for recording the data range of the set, when the data rebalance is performed, the data range of the data to be stored in each set changes, and a final change represents the data range determined based on the data rebalance information. In an embodiment of this disclosure, by updating the data range recorded in the partition space, the correspondence between each partition space and sets of the partition table is determined based on the updated data range recorded in the partition space.

S104: Update data distribution in the sets of the partition table based on the correspondence.

Specifically, the correspondence between partition space and sets after the update reflects a logical correspondence. To achieve the data rebalance of the partition table, an actual implementation is to move data stored in the sets, so that the data finally stored in each set (data storage in the physical sense) satisfies requirements of the data rebalance information set by the user.

Data involved in the data processing method provided in the embodiment of this disclosure may be stored on a blockchain.

In an embodiment, the sets are sorted based on the value ranges of the partition keys or key values. S104 may include the following operations:
- performing following adjustment operations sequentially for each set contained in the partition table:
- comparing the data range of data currently stored in the set with the data range recorded in the partition space corresponding to the set;
- in a case that a maximum value of a partition key corresponding to the data range of the data currently stored in the set is greater than the maximum value of a partition key in the partition space recorded in the partition space corresponding to the set, determining first data of the to-be-changed set based on the maximum value of the partition key in the partition space corresponding to the set, and creating a new first set for the first data of the to-be-changed set; and
- in a case that a minimum value of a partition key corresponding to the data range of the data currently stored in the set is less than the minimum value of a partition key in the partition space recorded in the partition space corresponding to the set, determining second data of the to-be-changed set based on the minimum value of the partition key in the partition space corresponding to the set, and creating a new second set for the second data of the to-be-changed set.

In an embodiment, to determine the first data of the to-be-changed set, and to create a new first set for the first data of the to-be-changed set, the following operations may be performed:
- marking a maximum split point in the set based on a maximum value of the partition key in the partition space corresponding to the set;
- creating the new first set for the first data of the to-be-changed set in each set; and
- establishing an association between the set and the first set.

The determining second data of the to-be-changed set based on the minimum value of the partition key in the partition space corresponding to the set, and creating a new second set for the second data of the to-be-changed set includes:
- marking a minimum split point in the set based on the minimum value of the partition key in the partition space corresponding to the set;
- creating the new second set for the second data of the to-be-changed set in each set; and
- establishing an association between the set and the second set.

In an embodiment, S104 may be implemented as:
- performing, based on the correspondence, the following data movement operations for each set that needs to be split;
- moving the first data to a corresponding first set, the first data being a data corresponding to the partition key between a maximum value of the partition key recorded in the partition space corresponding to the partition space and the maximum value of the partition key corresponding to the data range of the data currently stored in the set;
- moving the second data to a corresponding second set, the second data being a data corresponding to the partition key between a minimum value of the partition key corresponding to the data range of the data currently stored in the set and the minimum value of the partition key in the partition space corresponding to the set; and
- deleting a mark of the maximum split point, a mark of the minimum split point, and the associations.

In an embodiment, adding at least one partition space to the partition table in S102 includes the following steps S1021 to S1022:

S1021: Correspondingly add a partition space for each set in the partition table.

Specifically, partition spaces can be added according to the sets currently included in the partition table in a one-to-one correspondence. In this case, in the embodiment of this disclosure, the data distribution of the data actually stored in each set can be adjusted within the value range or key value of the partition key covered by each original set.

S1022: Add, based on the data rebalance information, at least one group of partition spaces and empty data storage units with correspondence to the partition table, and data storage information recorded in the partition spaces is determined based on the data rebalance information.

Specifically, if a definition of the set in the currently represented data rebalance information, that is, the value range or key value of the partition key logically covered by each new set is greater than the value range or key value of the partition key logically covered by the original set in the original partition table, at least one group of partition spaces and sets with a correspondence can be added to the partition table. The newly added sets are empty, that is, no data is stored in the physical sense, and the data ranges recorded in the partition spaces corresponding to the newly added sets are determined based on the data rebalance information. Descriptions are provided by using an example: in the current partition table, the value range of the partition key covered by each set is [0, 10000); and in the data rebalance information, when the value range of the partition key covered by each set is set to [0, 15000), a group of partition spaces and empty sets with correspondence may be adaptively add, and the value ranges of the partition keys in the data ranges recorded in the newly added partition spaces are [10000, 15000).

Figure 10A:
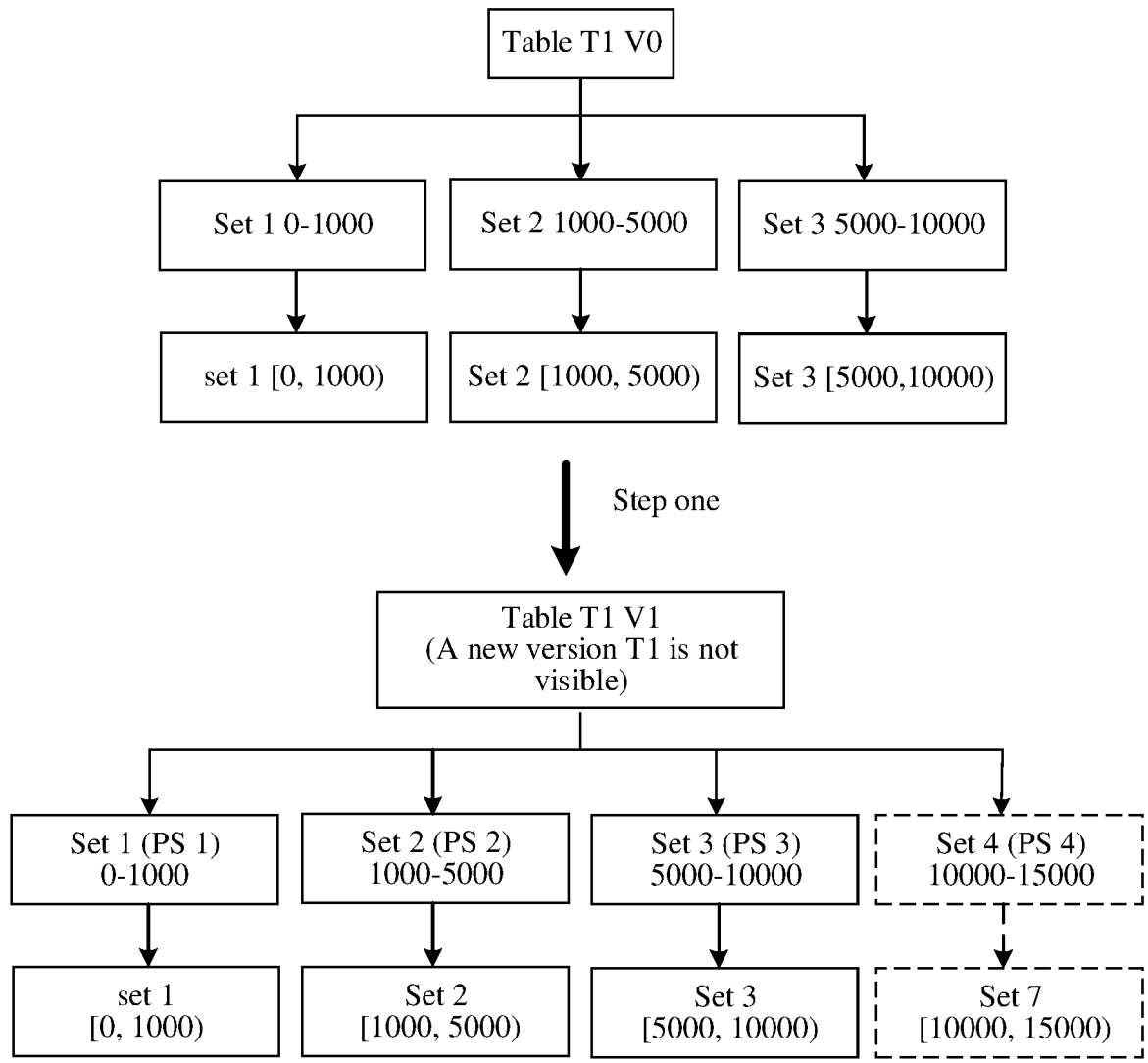
FIG. 10A is a schematic diagram of performing a first step in an application example of a data processing method according to an embodiment of this disclosure.

In an embodiment, implementation of S1022 may refer to the schematic content of FIG. 10A.

In an embodiment, the data processing method provided may further include the following S1010:

S1010: Create a partition space list based on the partition space, the partition space list being configured to record, during a data rebalance process, at least one of information of the data range recorded in each partition space, the correspondence between the partition space and the set, a name of the each partition space, and correspondence between the partition space and the partition table.

Specifically, a system table may be adaptively generated for the partition spaces added in the partition table to save management information for each partition space. Descriptions are given below with reference to FIG. 4 and the following Table 1 and Table 2:

TABLE 1

| Table name | Space name | Value range | Set name |
|---|---|---|---|
| Test t1 | PS1 | [0, 1000) | set 1 |
| Test t1 | PS2 | [1000, 5000) | set 2 |
| Test t1 | PS3 | [5000, 10000) | set 3 |

Specifically, with reference to the original partition table in FIG. 4 and Table 1 above, it can be seen that each partition space (PS) is in one-to-one correspondence with the data storage unit, set, and in this case, the added partition space can be used for recording logical expression content (data range) of data actually stored in each set, that is, the value range of the partition key. Table 1 is the partition space list created in S1010, which can record the table name (such as test t1), the partition space name (such as PS1), the data range of the partition key (such as [0, 1000)), the set name (such as set 1), and other information, and accordingly, a correspondence among the table name, space name, data range, and set name can also be known through the table.

TABLE 2

| Table name | Space name | Value range | Set name |
|---|---|---|---|
| Test t1 | PS1 | [0, 1500) | set 1 |
| Test t1 | PS2 | [1000, 1500) | set 2 |
| Test t1 | PS2 | [1500, 4500) | set 3 |
| Test t1 | PS3 | [4500, 7500) | set 4 |
| Test t1 | PS4 | [7500, 15000) | set 5 |

With reference to FIG. 4 and Table 2 above, it can be seen that Table 2 corresponds to information saved in the partition space list after data rebalance, and compared with Table 1, partition space PS4 and sets 4 and 5 are added. In terms of correspondence, the same partition space may correspond to two sets (PS2 corresponds to sets 2 and 3).

In an embodiment of this disclosure, through Table 1 and Table 2 above, it can be seen that the partition space list created based on the partition space changes one by one with changes of the data range recorded in the partition space, the correspondence between the partition space and the set, and the like during the data rebalance process. By querying a partition list, the progress of current data rebalance can be quickly determined; in addition, after data rebalance processing is completed, the degree of conformity of the data organization structure of the rebalanced partition table to the data rebalance rules can be quickly verified based on the partition space list.

In an embodiment, updating the correspondence between the partition space and the set based on a predefined data range corresponding to at least one set in the data rebalance information in S103 includes the following steps A1 to A4:

Step A1: Determine, based on the data rebalance information, the predefined data range of each set in the partition table.

Specifically, the data rebalance information may include only the definition of a set needing to be adjusted, or include the definition of each set in the rebalanced partition table. To adapt to different situations, the data rebalance information may correspond to the following two possible embodiments (taking the data storage information being the value range of the partition key as an example):

(1) When the data rebalance information includes only the definition of the set to be adjusted, that is, including a logical data range of at least one set, the data range of the partition space corresponding to each set in the rebalanced partition table can be updated based on the data rebalance information in combination with the data stored in the physical sense of each set in the original partition table. Specifically, the logical data ranges of the current sets can be determined first, for example, set 1 corresponds to [0, 1000), and set 2 corresponds to [1000, 5000); in the data rebalance information, the predefined data range of set 2 corresponds to [1000, 2500); the predefined data range of set 3 corresponds to [2500, 5000). Thus, it can be determined that the predefined data range for each set in the partition table in this case is as follows: the partition space of set 1 corresponds to [0, 1000), and the predefined data range of set 2 corresponds to [1000, 2500); and the predefined data range of set 3 corresponds to [2500, 5000). Set 3 may be a newly added set.

(2) When the data rebalance information includes the definition of all sets in the adjusted partition table, that is, including the logical data range of all the sets, the data range can be directly used as the predefined data range of each set, that is, in embodiment (2), it can be directly obtained, based on the data rebalance information in combination with the example in embodiment (1), that the predefined data range of set 1 corresponds to [0, 1000) and the predefined data range of set 2 corresponds to [1000, 2500); and the predefined data range of set 3 corresponds to [2500, 5000).

Step A2: Adjust the sets contained in the partition table based on the new data ranges of the sets.

Specifically, since the predefined data range corresponding to each set may not correspond to the data range of the data actually stored in the current sets in the partition table, the following situations may occur in the case of no correspondence (taking the data range being the value range of the partition key as an example):

(1) A minimum value of the value range of the logically corresponding partition key of the data actually stored in one or more sets is less than a minimum value of the corresponding predefined data range;

(2) The maximum value of the value range of the logically corresponding partition key of the data actually stored in one or more sets is greater than a maximum value of the corresponding predefined data range;

(3) A maximum value of the total value range of the logically corresponding partition key of the data actually stored in all sets is less than the maximum value of the predefined data range of the sets;

(4) A minimum value of the total value range of the logically corresponding partition key of the data actually stored in all sets is greater than the minimum value of the predefined data range of the sets.

In view of the foregoing situations, it can be seen that the data actually stored in each set in the partition table needs to be adjusted, and before the adjustment of the physically stored data is realized, it is necessary to lay out corresponding sets in the partition table, that is, it may be necessary to add or reduce sets on the basis of the data organization structure of the original partition table.

Step A3: Update, based on the predefined data range, the data range recorded in each partition space.

Specifically, the data range of existing records in each partition space can be directly replaced with the predefined data range corresponding to each set determined in step A1. It may be understood that the sets determined in step A1 are in one-to-one correspondence with the partition spaces, and reference may be made to the schematic content of FIG. 10C.

Step A4: Update, based on the data range recorded in each updated partition space, a correspondence between the partition space and the sets contained in the adjusted partition table.

Figure 10B:
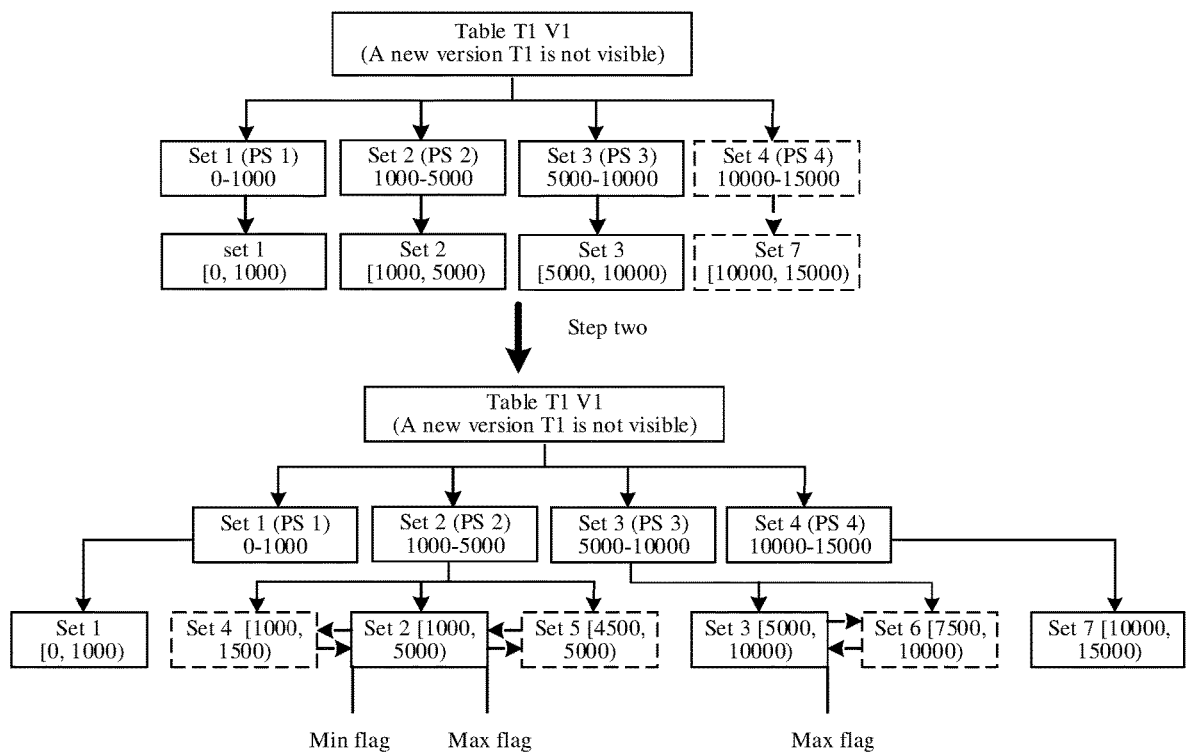
FIG. 10B is a schematic diagram of performing a second step in an application example of a data processing method according to an embodiment of this disclosure.
Figure 10C:
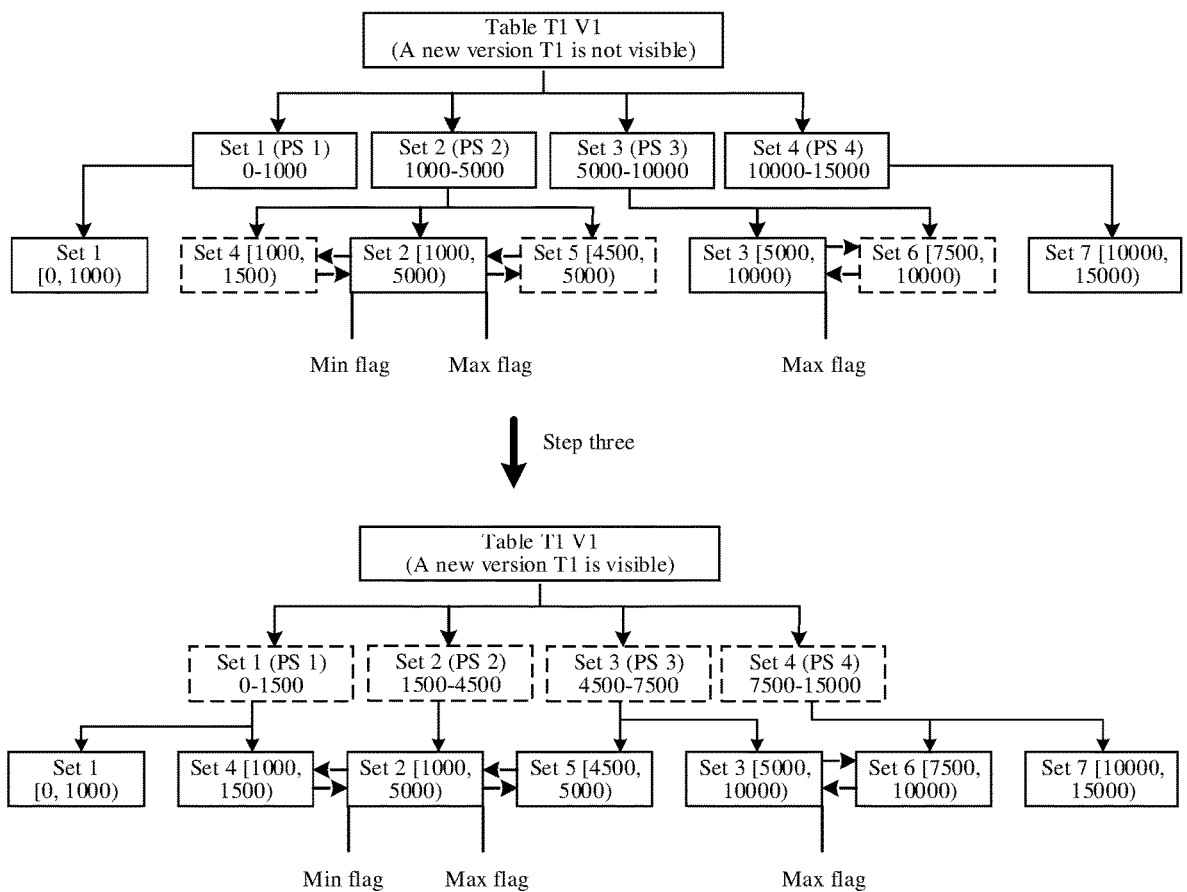
FIG. 10C is a schematic diagram of performing a third step in an application example of a data processing method according to an embodiment of this disclosure.
Figure 10D:
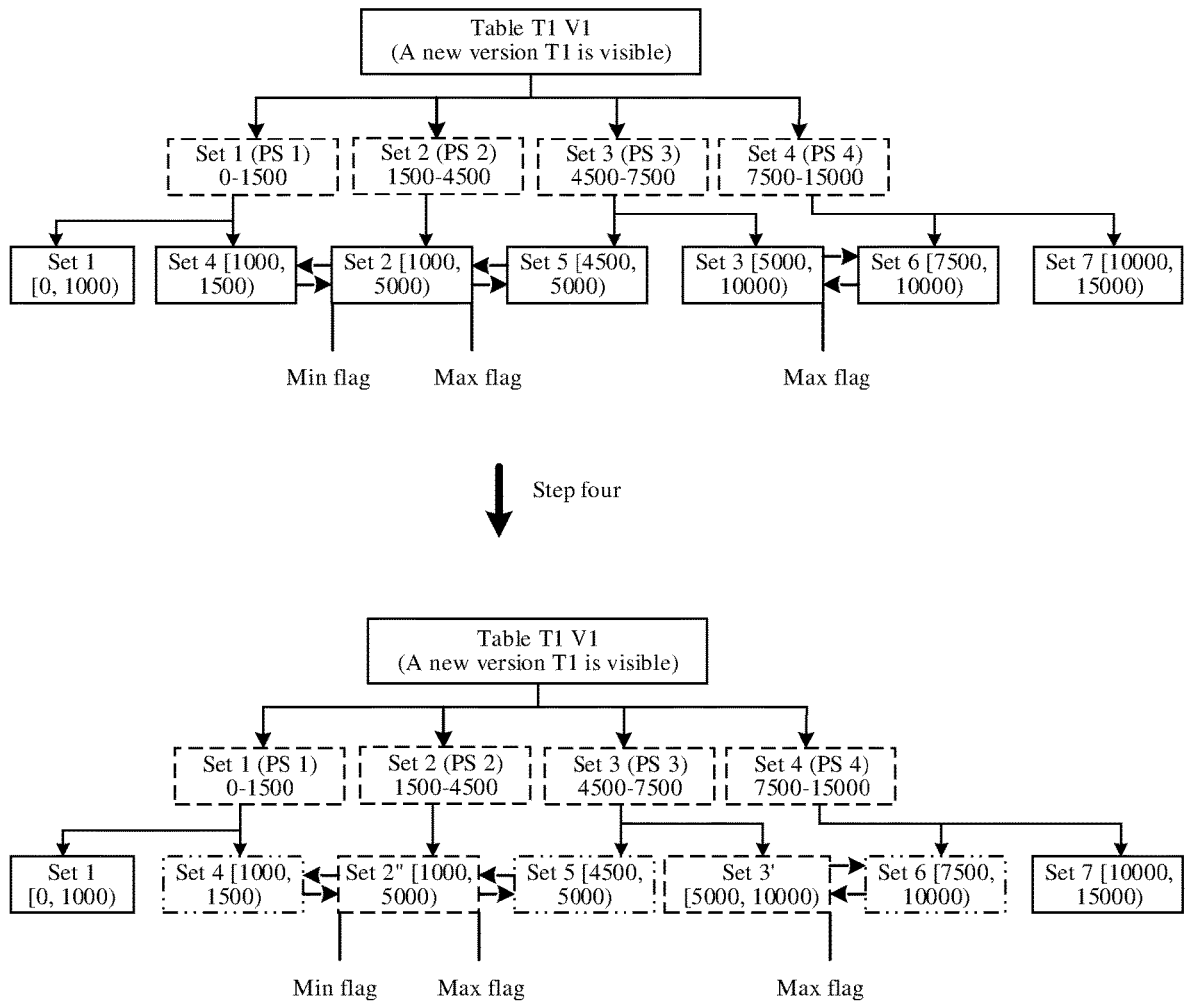
FIG. 10D is a schematic diagram of performing a forth step in an application example of a data processing method according to an embodiment of this disclosure.

Specifically, before actual data rebalance, based on the data range recorded in each updated partition space, a correspondence between the data range after adjusting the data organization structure of the partition table in step A2 and each partition space is adaptively adjusted, that is, the data range actually managed by the partition space is adjusted, and reference may be made to the schematic content of FIG. 10C and FIG. 10D.

In an embodiment, the sets are sorted based on the value ranges of the partition keys or key values. Adjusting the sets contained in the partition table based on the predefined data range in step A2 includes the following step A21:

Step A21: Perform the following adjustment operation steps A211 to A213 sequentially for each data storage unit contained in the partition table:

Step A211: Compare current data storage information of the sets with predefined data storage information.

Step A212: If the maximum value of the partition key corresponding to the set is greater than the maximum value of the partition key in the predefined data storage information, split the set based on the maximum value of the partition key in the predefined data storage information.

Specifically, taking the value range of the partition key corresponding to the set being [1000, 5000) as an example, if the value range of the partition key in the predefined data storage information corresponding to the set is [1500, 4500), since 5000 is greater than 4500, the set is split based on the key value 4500 of the partition key.

Step A213: If the minimum value of the partition key corresponding to the set is less than the minimum value of the partition key in the predefined data range, split the set based on the minimum value of the partition key in the predefined data range.

Specifically, taking the value range of the partition key corresponding to the set being [1000, 5000) as an example, if the value range of the partition key in the predefined data range corresponding to the set is [1500, 4500), since 1000 is less than 1500, the set is split based on the key value 1500 of the partition key.

Specifically, reference may be made to the schematic content of FIG. 10B. It may be understood that, for any set, step A212 and step A213 described above may be performed simultaneously, or only step A212 or step A213 may be performed, or neither of step A212 and step A213 may be performed.

In an embodiment, splitting the set based on the maximum value of the partition key in the predefined data range in step A23 includes the following step A231:

Step A231: Generate an empty first set based on the maximum value of the partition key in the predefined data range and the maximum value of the partition key corresponding to the set.

Specifically, as shown in FIG. 10B, for a newly generated set 5, the data currently stored therein is empty, but the value range of the logically corresponding partition key thereof can be determined based on the maximum value 5000 of set 2 and the maximum value 4500 of the value range of the partition key in the predefined data range, that is, the value range of the partition key corresponding to set 5 is [4500, 5000) in this case. For a newly generated set 6, the data currently stored thereof is empty, but the value range of the logically corresponding partition key thereof can be determined based on the maximum value 10000 of set 3 and the maximum value 7500 of the value range of the partition key in the predefined data range, that is, the value range of the partition key corresponding to set 6 is [7500, 10000) in this case.

In an embodiment, splitting the set based on the maximum value of the partition key in the predefined data range in step A23 further includes the following step A232:

Step A232: Mark a maximum split point in the set based on the maximum value of the partition key in the predefined data range, and establish an association between the set and the first set.

Specifically, to adapt to the example in step A231, a maximum split point (max flag) may be marked in set 2 based on the key value 4500 of the partition key; and a maximum split point (max flag) may be marked in set 3 based on the key value 7500 of the partition key.

Since the value range of the partition key corresponding to the newly generated set 5 is a part of the value range of the partition key corresponding to set 2 in the original partition table, an association between set 2 and set 5 can be established, as shown in FIG. 10C. Since the value range of the partition key corresponding to the newly generated set 6 is a part of the value range of the partition key corresponding to set 3 in the original partition table, an association between set 3 and set 6 can be established.

In an embodiment, splitting the set based on the minimum value of the partition key in the predefined data range in step A24 includes the following step A241:

Step A241: Generate an empty second set based on the minimum value of the partition key corresponding to the set and the minimum value of the partition key in the predefined data range.

Specifically, as shown in FIG. 10B, for a newly generated set 4, the data currently stored therein is empty, but the value range of the logically corresponding partition key thereof can be determined based on the minimum value 1000 of set 2 and the minimum value 1500 of the value range of the partition key in the predefined data range, that is, the value range of the partition key corresponding to set 4 is [1000, 1500) in this case.

In an embodiment, splitting the set based on the minimum value of the partition key in the predefined data range in step A24 includes the following step A242:

Step A242: Mark a minimum split point in the set based on the minimum value of the partition key in the predefined data range, and establish an association between the set and the second set.

Specifically, in view of the example in step A241, a minimum split point (min flag) may be marked in set 2 based on the key value 1500 of the partition key.

Since the value range of the partition key corresponding to set 4 is a part of the value range of the partition key corresponding to set 2 in the original partition table, an association between set 2 and set 4 can be established.

In an embodiment, updating the data distribution of the partition table based on the correspondence between the updated partition space and the set in S104 includes the following steps S1041 to S1042:

S1041: Perform, based on the correspondence between the updated partition space and the set, the following data movement operation steps B1 to B2 for each set that needs to be split:

Step B1: Move data corresponding to the partition key between the maximum value of the partition key in the predefined data range and the maximum value of the partition key corresponding to the set to a corresponding first set.

Figure 10E:
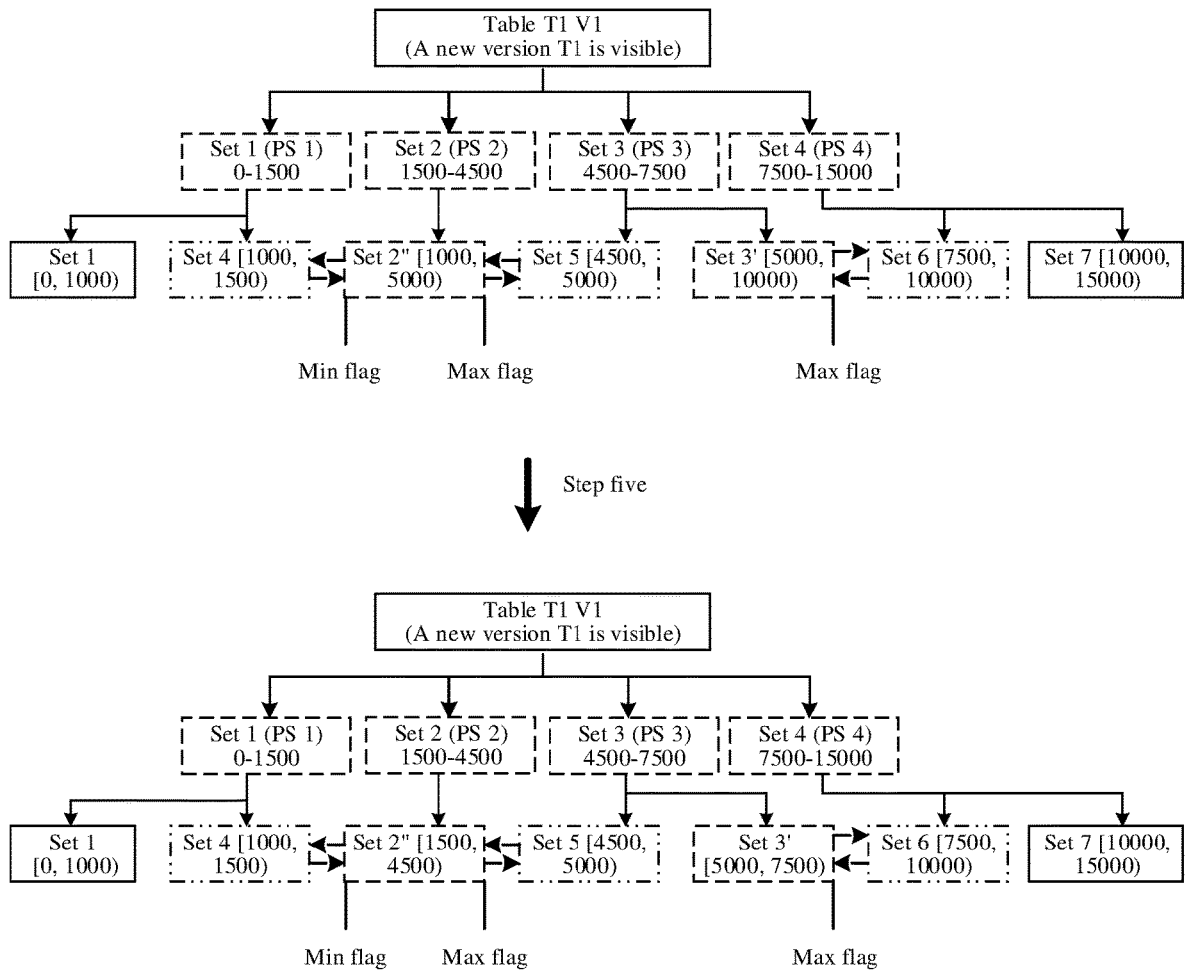
FIG. 10E is a schematic diagram of performing a fifth step in an application example of a data processing method according to an embodiment of this disclosure.

Specifically, as shown in FIG. 10E, part of data in set 2 that actually needs to be stored in set 5 may be moved to set 5, and in this case, the data actually stored in set 2 is reduced. Part of data in set 3 that actually needs to be stored in set 6 may be moved to set 6, and in this case, the data actually stored in set 3 is reduced.

Step B2: Move data corresponding to the partition key between the minimum value of the partition key of the set and the minimum value of the partition key in the predefined data range to a corresponding second set.

Specifically, as shown in FIG. 10E, part of data in set 2 that actually needs to be stored in set 4 may be moved to set 4.

In the embodiments of this disclosure, implementation of step B1 and step B2 is to only process the data needing to be moved, while the data that does not need to be moved remains in the corresponding set. In a data movement process, it is necessary to lock the data, but because the amount of data moved is small, and execution time required is short, data locking time is also very short, so that in the embodiments of this disclosure, there is very little impact on the ongoing read and write operations (which may be some user services) during data movement.

S1042: Delete the maximum split point, the minimum split point, and the association between the sets.

Specifically, the maximum split point, the minimum split point, and the association between the sets can represent a movement relationship between data in a data rebalance process, and can be used for performing data read and write operations in data rebalance processing. After the data rebalance is completed, that is, after the actual storage of data in each set has been adjusted according to user-defined data rebalance rules, each split point and the association between the sets can be deleted.

In an embodiment, in the data processing method provided, before completing the data distribution update of the partition table, the following steps C1 to C2 may be further included:

Step C1: In response to a processing operation on target data, in a case of determining that a key value of the partition key corresponding to the target data is greater than the key value of the partition key corresponding to the maximum split point of any set or less than the key value of the partition key corresponding to the minimum split point of any set, query the target data in the set.

Specifically, the processing operation on the target data may be data read and write operations, that is, in a process of performing data rebalance, when the read and write operations on the target data issued by the user or server are received, a location where the target data is actually stored can be obtained based on the marked split points and the established association between the sets. It may be understood that the processing of querying the target data in the set in step C1 is implemented on the basis of determining that the target data has a corresponding storage location in the partition table.

Step C2: In a case that a storage location corresponding to the target data is obtained by querying, return a processing result for the target data; and in a case that the storage location is not found by querying, determine, based on the association corresponding to each set, the storage location corresponding to the target data in the first set or the second set corresponding to the set, and return the processing result for the target data.

Specifically, the following describes an operation process of read and write operations in the data rebalance process:

First situation: a process of performing target data processing operations by using an old version of a table. If the storage location corresponding to the target data is not found in the old set (which is the set contained in the original partition table), and the storage location corresponding to the target data is found to be outside a split point (flag) marked in a certain set, it indicates that the target data may be moved to a set generated by splitting, and data traversal needs to be performed in the corresponding newly generated set again, thereby determining whether the target data is stored in the partition table.

Second situation: a process of performing target data processing operations by using a new version of a table. If the storage location of the target data is not determined in any set of the partition table of which the data organization structure has been adjusted, and there is a link (which is determined based on the association between the sets) to other set (which is a newly generated set) in the set (which is the old set in the original partition table), the storage location of the target data needs to be continued to be found in the corresponding set (which is a newly generated set). An operation process of querying the target data in the newly generated set is as follows:

If the target data is not outside the flag of the corresponding set (which is the old set in the original partition table), it indicates that the target data does not belong to the data range of the set that needs to be split, then it can be determined that the target data does not exist in the partition table, and a corresponding processing result (which is that the target data is not found in the partition table by querying) may be returned directly.

If the target data is outside a flag range of the corresponding set, and a corresponding split range is found, the target data may be continued to be queried. If the storage location of the target data is not found by querying, it also indicates that the target data does not exist in the partition table, and the corresponding processing result may be returned directly. If data (which is the to-be-moved data in the set that needs to be split) is found in the flag, a processing result of returning the target data may be locked. If the data (which is the to-be-moved data in the set that needs to be split) is found in the flag, but the data has been marked as deleted, it indicates that the data may be migrated, and the data can be queried in the newly generated set (that is, the first or second set). Mark delete is used for indicating that the to-be-moved data in the set that needs to be split has been migrated to the new set, and other methods may also be used for indicating that the data has been migrated.

Figure 5:
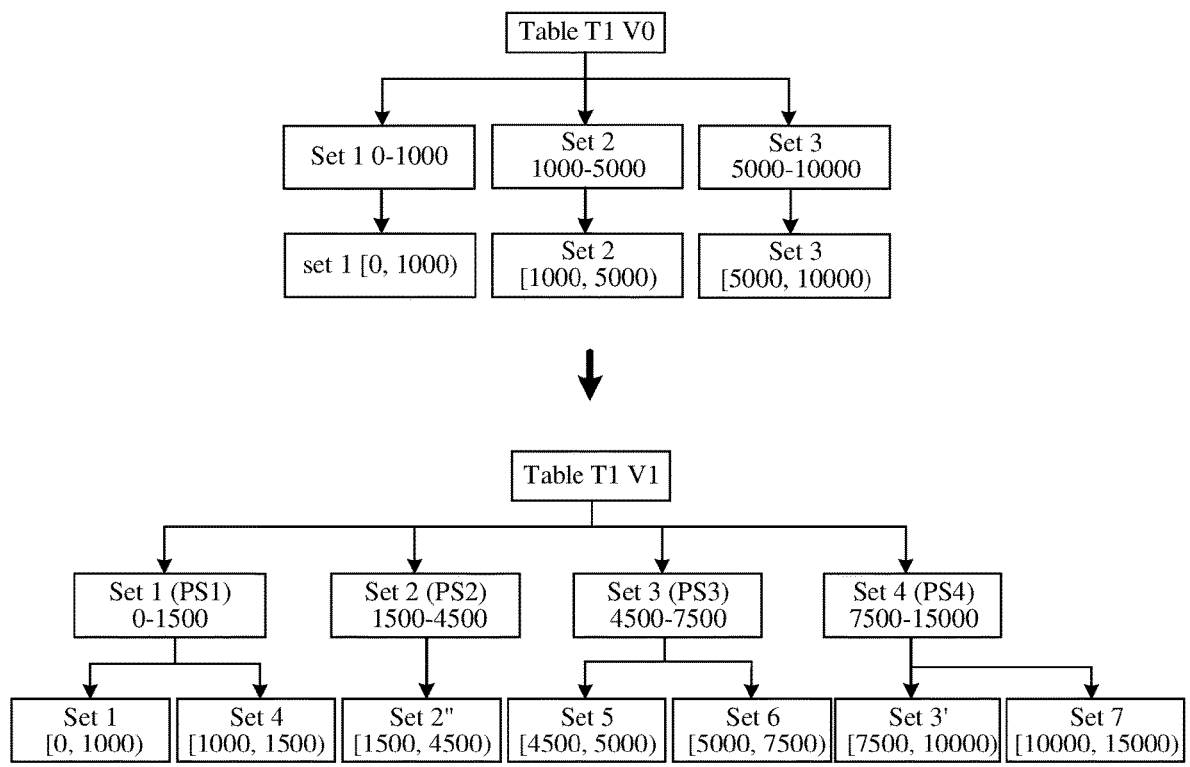
FIG. 5 is a schematic diagram of data rebalance executed for a partition table in a data processing method according to an embodiment of this disclosure.

With reference to FIG. 5, the following describes execution logic of the data processing method according to the embodiments of this disclosure from the overall data organization structure of the partition table:

As shown in FIG. 5, Table T1 V0 represents the old version of the partition table, and the data organization structure of the to-be-rebalanced partition table can be seen from FIG. 5. Table T1 V1 shows the new version of the partition table, and the updated data organization structure of the partition table that has been data rebalanced can be seen from FIG. 5.

Data organization structure change 1: set 1 needs to change to [0, 1500) from original [0, 1000):

1.1: If a management space PS1 of the original set 1 already contains that set 1 is [0, 1000), set 1 remains unchanged;

1.2: Part of the stored data [1000, 1500) needs to be assigned to set 1 from set 2 corresponding to [1000, 1500) in a management space PS2 of set 2. Therefore, data [1000, 5000) corresponding to the original set 2 is first decompressed into set 4 [1000, 1500) and a set 2'[1500, 5000); and set 4 is moved from the management scope PS2 of set 2 to the management scope PS1 of set 1, then the rebalance process of set 1 is completed.

Data organization structure change 2: set 3 is changed to [4500, 7500) from [5000, 1000):

2.1: Two new sets, set 2" corresponding to [1500, 4500) and set 5 corresponding to [4500, 5000), are split out from set 2' corresponding to [1500, 5000) split from set 2 in step 1.2.

2.2: Set 5 is moved from the management scope PS2 of set 2 to the management scope PS3 of set 3, and in this case, the rebalance process of set 2 is completed.

2.3: A set of the previous set 3 corresponding to [5000, 10000) is split into set 6 corresponding to [5000, 7500) and set 3' corresponding to [7500, 10000).

2.4: Set 3' is moved from the management scope PS3 of set 3 to the management scope PS4 of set 4, and in this case, the rebalance process of set 3 is completed.

Data organization structure change 3: set 4 is a newly added set, and corresponding information needs to be added in a data dictionary; in addition, a set of set 7 corresponding to [10000, 15000) is added accordingly, and the rebalance process of set 4 is completed.

Figure 6:
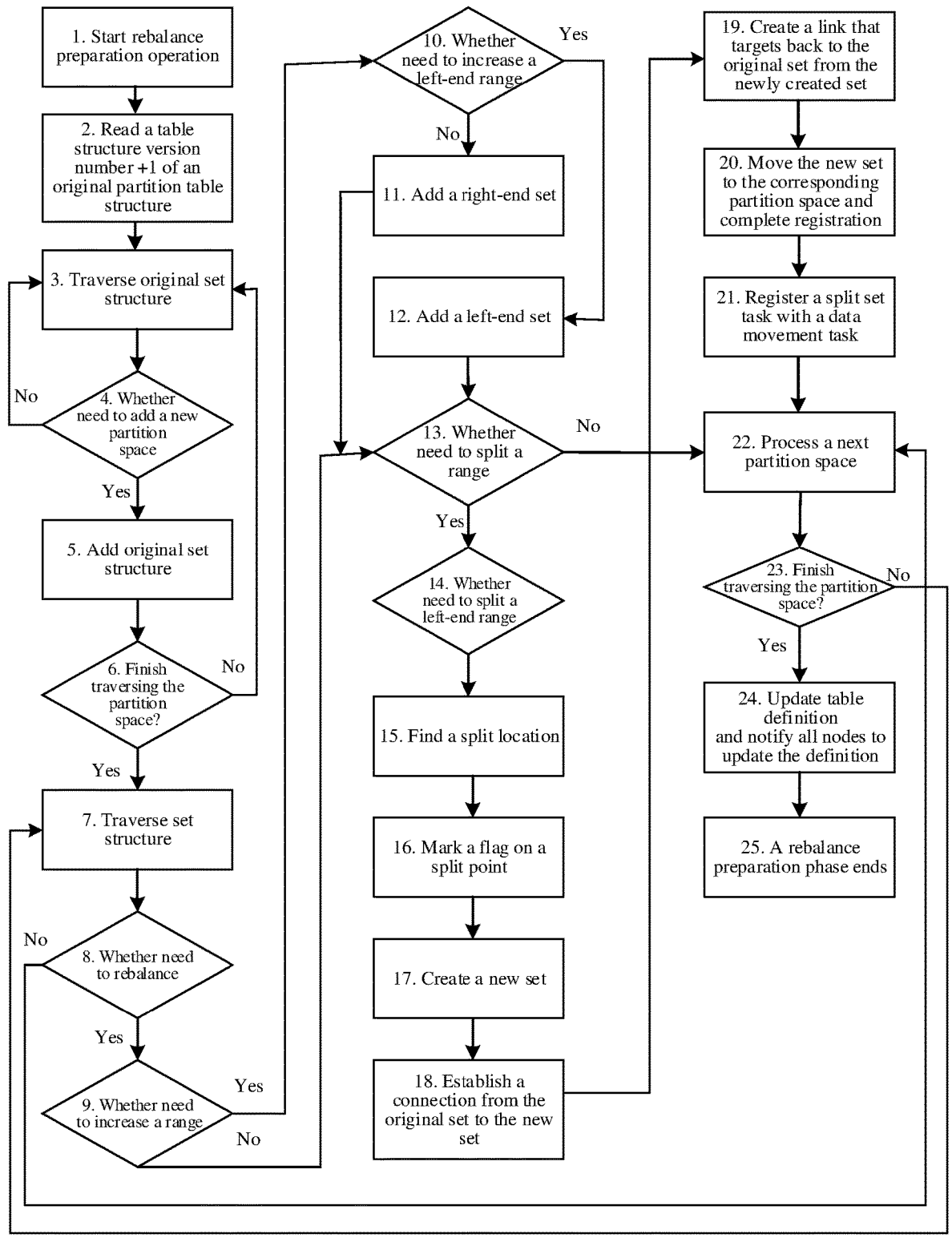
FIG. 6 is a flowchart of a task preparation phase in a data processing method according to an embodiment of this disclosure.

With reference to FIG. 6, the following describes execution operations of a task preparation phase (which is a first phase) for the data rebalance on the partition table in the data processing method according to the embodiments of this disclosure:

Step 1: A user performs a data rebalance operation on the partition table by using DDL statements.

Step 2: Read a data dictionary definition (that is, the definition of each set, such as the value range of the partition key corresponding to set 1) of the original partition table, and create a new partition table structure (an integer can be used for representing a version number of the partition table, and the version number +1 is used for representing the version of the updated partition table). Specifically, in the embodiments of this disclosure, only the structure of the partition table is adjusted, and the original partition table used in the description corresponds to the old version of the table, and there is no need to create a new partition table.

Step 3: Traverse a set structure of the original table.

Step 4: Determine whether the rebalance operation generates a new partition space; if yes, perform step 5; if no, return to step 3, and traverse the next partition space.

Step 5: Add an empty partition space to the new partition table structure.

Step 6: Determine whether traversal of the partition space is completed, if yes, perform step 7; if no, return to step 3.

Step 7: Traverse the partition structure (that is, the partition space).

Step 8: Determine whether rebalance is required for the current partition space; if no, perform step 22, and process the next partition space; if yes, perform step 9.

Step 9: Determine whether to add a range; if yes, add a left-end set and a right-end set for a list set type (because operation for the list type is similar to that for the range type, a range set is used for illustration in FIG. 6). The range is added, that is, an empty set is directly added, and at the same time, registration with the partition space is completed, generally a newly range indicates that the original partition table does not contain data of the new range, so the new range does not involve subsequent data migration, and the operation of adding a range is completed after modifying the data dictionary partition space and range information. If no, perform step 13.

Step 10: Determine whether to add a left-end range: if yes, perform step 12; if no, perform step 11.

Step 11: Add a right-end set.

Step 12: Add a left-end set.

Step 13: Determine whether there is a need to split a range; if yes, split a set into a left-end set and a right-end set; if no, perform step 22.

Step 14: Determine if a left end is split, and whether or not, perform step 15.

Step 15: Find a split data cutoff point (which is a split point).

Step 16: Mark a flag on the split point (herein, the left end is split into a minimum split point min-flag, and the right end splits into a minimum split point max-flag).

Step 17: Create a new set, which is currently empty and does not have any stored data.

Step 18: Establish a connection from the original set to the new set.

Step 19: Establish a connection from the newly created set to the new set.

Step 20: Move the new set to the corresponding partition space and complete registration.

Step 21: Register the split with a moving data task list.

Step 22: Process the next partition space.

Step 23: Determine whether all partition spaces of the partition table have been processed; if no, return to step 7; if yes, perform step 24.

Step 24: Update the partition definition in the partition table, the partition table definition of the new version of being visible, and all nodes being instructed to update the definition (or not instructed).

Step 25: A rebalance preparation phase ends.

Figure 7:
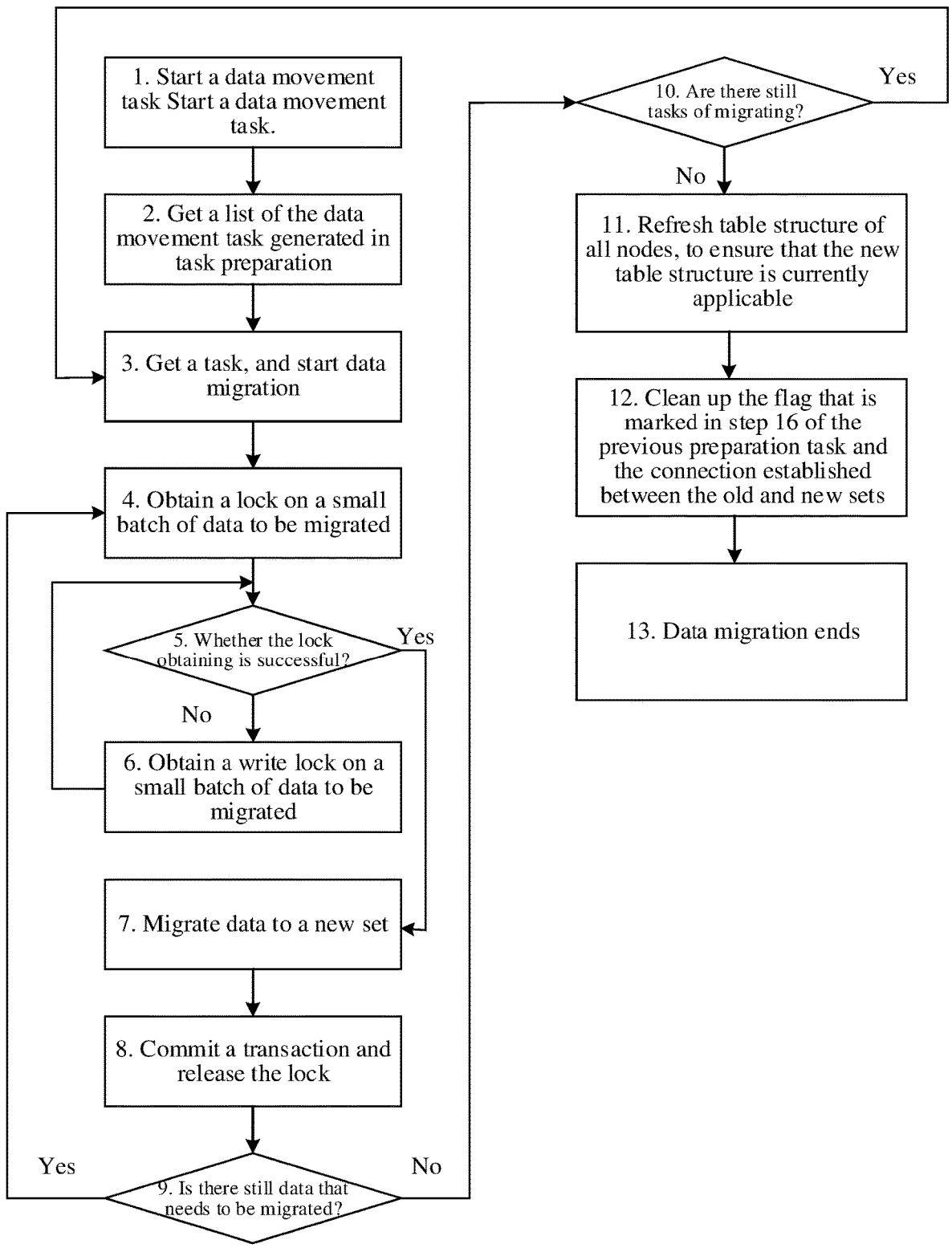
FIG. 7 is a flowchart of a data movement phase in a data processing method according to an embodiment of this disclosure.

With reference to FIG. 7, the following describes execution operations of a data movement phase (which is a second phase) for the data rebalance on the partition table in the data processing method according to the embodiments of this disclosure:

Specifically, the data movement phase of the rebalance operation occurs after the preparation phase, corresponding preparation work has been completed, and after the task preparation phase is completed, the data rebalance of the partition table has been logically completed for a user, but in fact, a migration operation on data has not been completed, but there is no influence on data read and write of the user.

Step 1: Start a data movement task.

Step 2: Load the task list prepared in the first phase that needs to migrate data.

Step 3: Acquire a task, and start a data migration task.

Step 4: Acquire a small batch of data to start migrating and locking; (the small batch of data may be the number of records specified by the user, or hard-coded), a small batch of data migration being adopted in the embodiment of this disclosure to minimize the congestion time for user read and write transactions in a process of data migration.

Step 5: Determine that the locking is successful; if not, it indicates that there is a user transaction being processed on the part of the data, and perform step 7; if yes, perform step 6.

Step 6: Wait for some time to reacquire a task.

Step 7: Migrate data to a new set, where the data is migrated without any modification to the data, and the data is only moved from the original set range to the new set, and metadata is not modified during the processing.

Step 8: Commit the transaction and release the lock on migrating data in step 4.

Step 9: Determine whether there is still data that needs to be migrated within the range; if no, perform step 10; if yes, perform step 4, and migrate the next batch of data.

Step 10: Determine whether there are still tasks requiring migration; if no, perform step 11; if yes, perform step 3, and continue to perform the next data migration task.

Step 11: Refresh the table structure of all nodes, to ensure that the table structure of all the nodes has been synchronized to the latest.

Figure 10F:
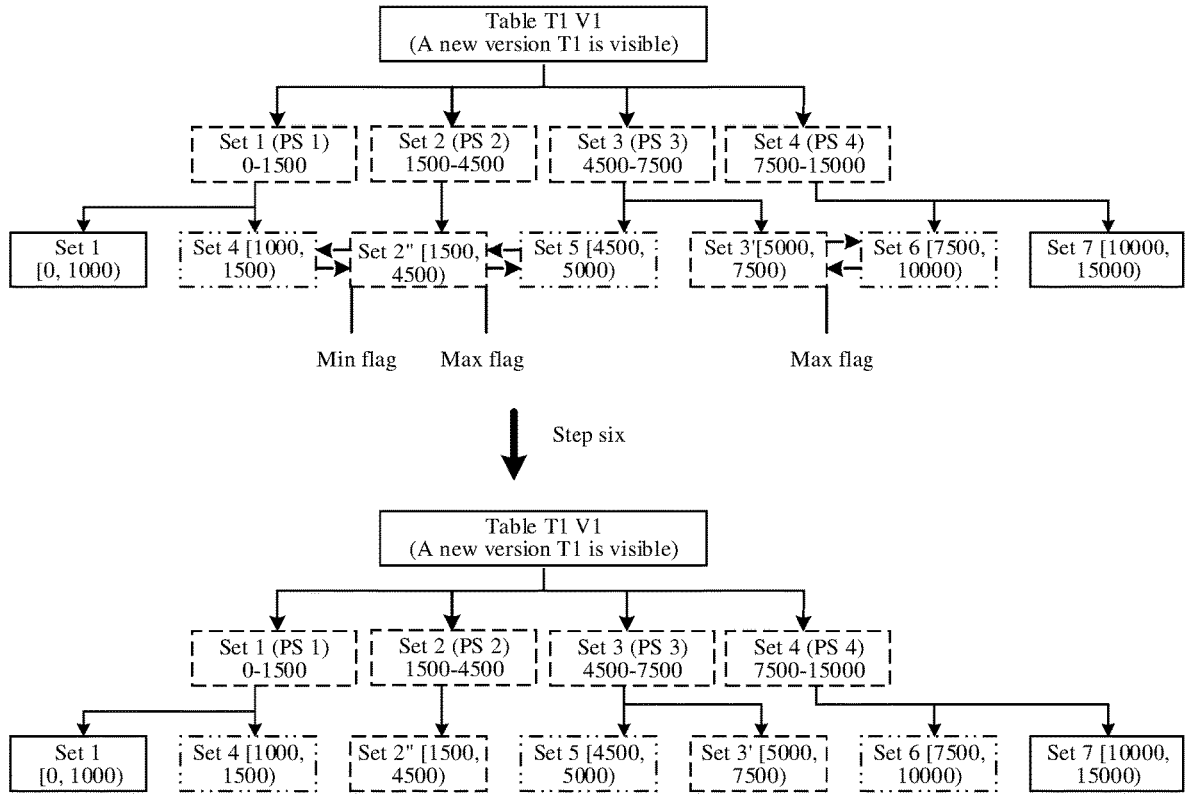
FIG. 10F is a schematic diagram of performing a sixth step in an application example of a data processing method according to an embodiment of this disclosure.

Step 12: Clear flag marks and links to other sets in all sets (as shown in FIG. 10F).

Step 13: The data migration ends.

Figure 8:
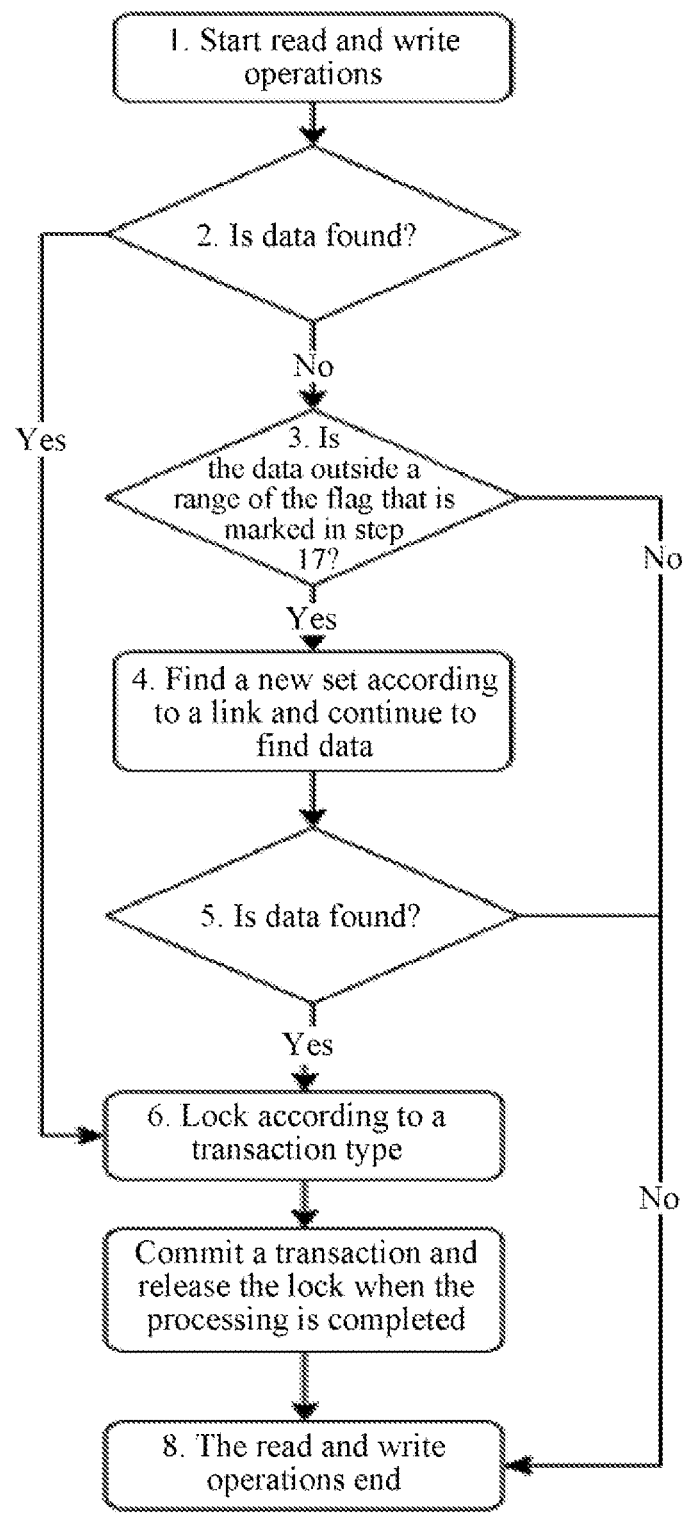
FIG. 8 is a flowchart of using an old version partition table for read and write operations in a data processing method according to an embodiment of this disclosure.

With reference to FIG. 8, the following describes execution operations of a read and write operation phase (which is a third phase) for the data rebalance on the partition table in the data processing method according to the embodiments of this disclosure:

Specifically, the old version table structure is used for manipulating data (as shown in Table T1 V0 in FIG. 10A); what is described is a phase from the first phase of preparation process to refreshing the table structure in step 11 after the second phase of data migration, some nodes may use the old table structure to manipulate the data, for an operation of new range data, only after refreshing to the new table structure in step 25 of the first phase, the user can operate on the data (a set needs to be added first) in the new data range.

Step 1: Start read and write operations.

Step 2: Determine whether eligible data is found; if no, perform step 3; if yes, perform step 6.

Step 3: Determine whether the data is outside the flag in step 17 of the first phase (to-be-migrated data); that is, outside the split point marked in the set in step 16 of the first phase; if no, the data does not exist in the partition table, and perform step 8 directly; if yes, jump to a connected set according to the link (the association between the sets) and continue to find the data.

Step 4: Determine whether the data is found; if no, the data does not exist in the partition table, and perform step 8 directly; if yes, perform step 6.

Step 5: Lock the data according to native logic.

Step 6: Commit the transaction when the processing is completed.

Step 7: The read and write operations end.

Figure 9:
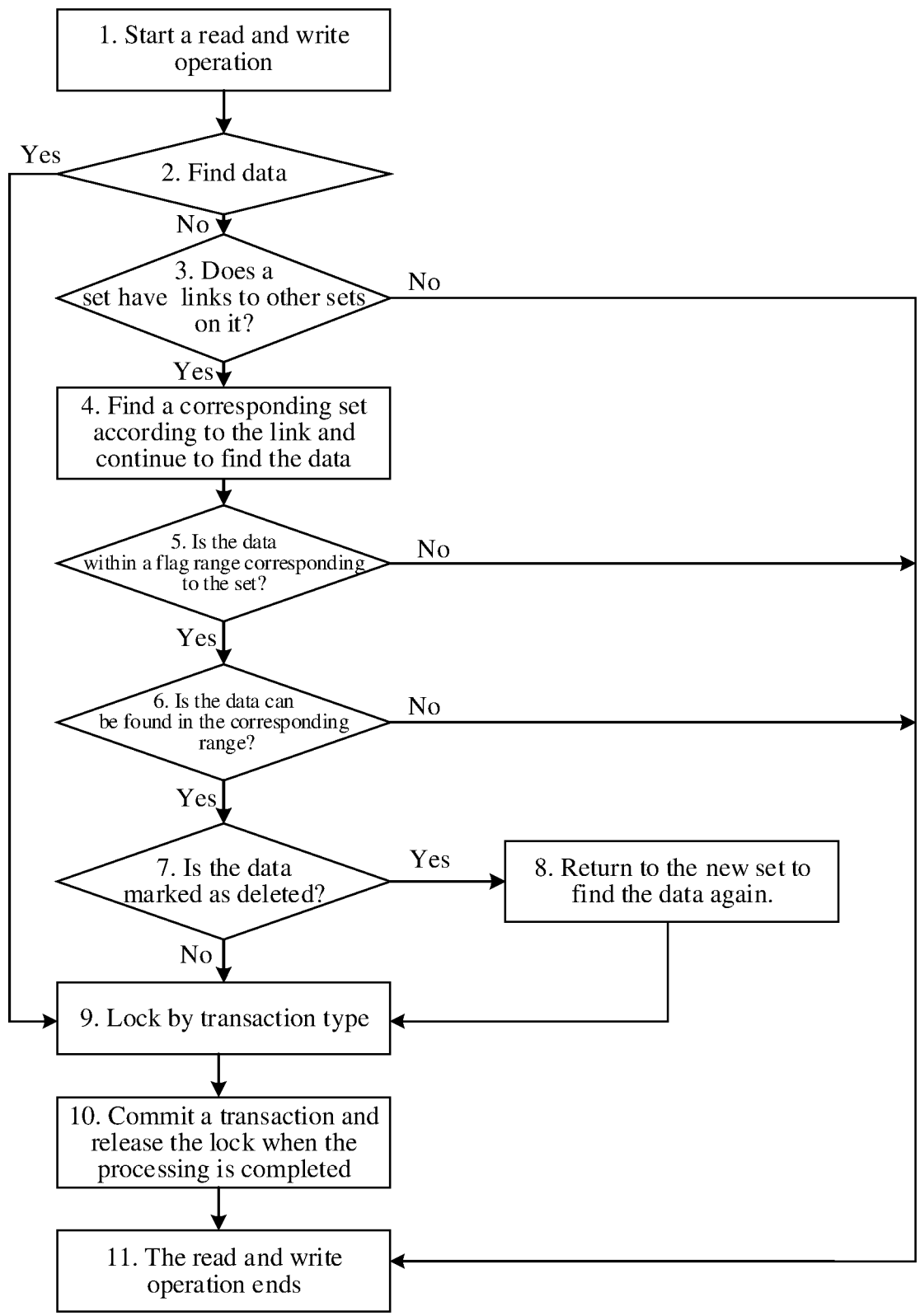
FIG. 9 is a flowchart of using a new version partition table for read and write operations in a data processing method according to an embodiment of this disclosure.

With reference to FIG. 9, the following describes execution operations of a read and write operation phase (which is a fourth phase) for the data rebalance on the partition table in the data processing method according to the embodiments of this disclosure:

Specifically, the new version of the table structure is used for reading and writing data:

Step 1: Start the read and write operations.

Step 2: Determine whether data is found; if no, perform step 3; if yes, perform step 7.

Step 3: Determine whether there is link on a set to other sets; if not, the data does not exist in the partition table; perform step 9; if yes, perform step 4.

Step 4: Find a corresponding set according to the links.

Step 5: Determine whether the data is within the flag range of the corresponding set, if the old set has a flag and then the new set is found, the retrieval of the original set from the new set means the data has not been migrated; if no, there is no corresponding data (the data does not exist in the partition table), and perform step 9; if yes, perform step 6.

Step 6: Determine whether eligible data is found; if no, there is no corresponding data (the data does not exist in the partition table), and perform step 9; if yes, perform step 7.

Step 7: Determine whether the data is marked as deleted; if the data is marked as deleted, it means that the part of the data has been migrated to a new set; if no, the data is not marked as deleted, and perform step 9; if yes, perform step 8.

Step 8: Return to the new set to find the data again.

Step 9: Lock according to a transaction type (such as read and write).

Step 10: Commit the transaction when the processing is completed.

Step 11: The read and write operations end.

In the embodiments of this disclosure, the third phase and fourth phase described above are actually implemented in the same data. According to the embodiments, are described separately, which is more conducive to a clear understanding of an implementation process of performing service operations on the target data in the data rebalance process.

The following further describes the data processing method according to the embodiments of this disclosure with reference to examples shown in FIG. 10A to FIG. 10F (taking the data range being the value range of the partition key as an example):

FIG. 10A illustrates a first step in performing data rebalance according to an embodiment of this disclosure: adding a partition space. Specifically, compared with Table T1 V0, Table T1 V1 represents a partition table of which the data organization structure has been adjusted, and the new version of Table T1 is invisible in the process of adding the partition space, that is, the user cannot view table T1 V1 generated in the step. The value range of the partition key covered in the original partition table is [0, 10000), while in the definition of T1 table structure of a V1 version, the value range of the partition key covered in the partition table is [0, 15000). Accordingly, set 7 and a partition space PS4 corresponding to set 7 are added.

FIG. 10B illustrates a second step in performing data rebalance according to an embodiment of this disclosure: traversing a set and consider whether splitting (adding a new set) is required. In an example in FIG. 10B, the value ranges of the three partition keys of set 4, set 5, and set 6 are added, and in this case, set 4, set 5, and set 6 in FIG. 10B are still empty, the three sets show only the value range of the partition key, and the actual stored data is still in set 2 and set 3.

FIG. 10C illustrates a third step in performing data rebalance according to an embodiment of this disclosure: adjusting the value range (which is not the actual data) of the partition key created in the second step to a correct set. In the third step, what are changed include the data range recorded in the partition space and the correspondence between each partition space and each set.

FIG. 10D illustrates a fourth step in performing data rebalance according to an embodiment of this disclosure. Specifically, the value range of the partition key of management data of each set in Table T1 is updated (that is, the set shown in a double-dot dash line box and a dotted line box in FIG. 10D is processed); in addition, the definition of table T1 may be opened to user perception, that is, the user can view the table at this time. Corresponding to the fourth step, that is, the first phase (which is a task preparation phase) shown in the foregoing embodiment is completed, that is, the user sends a DDL statement, and after the execution is completed, the user is given feedback that the rebalance is successful, but the data is not actually migrated (which refers to data movement in the physical sense).

FIG. 10E illustrates a fifth step in performing data rebalance according to an embodiment of this disclosure. Specifically, data movement processing in the physical sense is performed, and the completed data is moved according to definition of the set in partition management (the value range of the partition key). Comparing the structures of the two tables in FIG. 10E, it can be seen that the data actually stored in set 2" and set 3' have changed, and part of the data that is removed is moved into the set with which the data is associated.

FIG. 10F illustrates a sixth step in performing data rebalance according to an embodiment of this disclosure. Specifically, before the sixth step, all nodes can be refreshed to the latest table definition version. In this case, the split points marked in the previous step and the association between the sets may be removed.

In an embodiment of this disclosure, for example, in a change in the data organization structure from FIG. 10A to FIG. 10F, the first table in FIG. 10A corresponds to a partition table that needs to be rebalanced; the second table in FIG. 10F corresponds to a partition table after the end of the rebalance. The two respectively illustrate the data organization structure of the same table under different versions. Specifically, in the execution of the six steps shown in the foregoing embodiments, the user services may be processed synchronously, that is, the data processing method according to the embodiments of this disclosure may be an online implementation method, without a need to shut down the service; moreover, the processing of the user service and data rebalance is done on one piece of data, which is conducive to avoiding a problem of data inconsistency caused by new copies of data rebalance.

Figure 11:
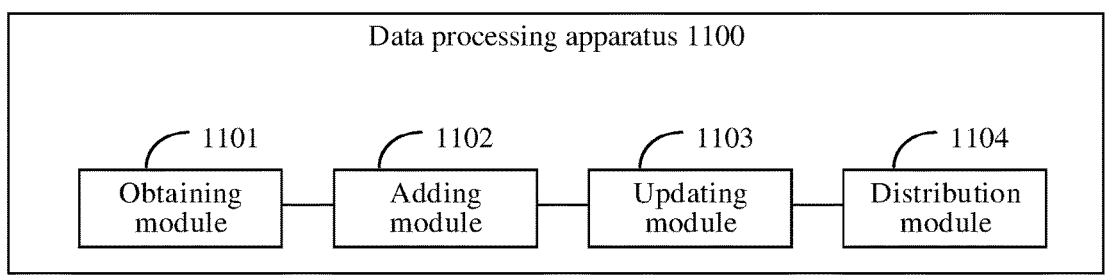
FIG. 11 is a schematic structural diagram of a data processing apparatus according to an embodiment of this disclosure.

An embodiment of this disclosure provides a data processing apparatus. As shown in FIG. 11, the data processing apparatus 1100 may include: an obtaining module 1101, an adding module 1102, an updating module 1103, and a distribution module 1104.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The obtaining module 1101 is configured to obtain data rebalance information, the data rebalance information representing a new partition plan for a partition table, and the partition table being a table for data distribution based on a partition key. The adding module 1102 is configured to create, for each set specified in the partition plan, a corresponding partition space, and record, in each partition space, a current data range of a set corresponding to the partition space, the data range including one of a value range of the partition key and a value list of the partition key. The updating module 1103 is configured to update the data range recorded in each partition space based on the partition plan, and determine a correspondence between each partition space and sets of the partition table by using the updated data range in each partition space. The distribution module 1104 is configured to update data distribution in the sets of the partition table based on the correspondence.

In an embodiment, the adding module 1102 is specifically configured to:

generate, for each current partition in the partition table, a corresponding partition space, and record the data range of the partition in the partition space corresponding to each set; and create a new set in a case that the partition plan indicates that a new set is to be created, generate, for the new partition, a corresponding partition space corresponding to the new set, and record, in the partition space, a data range corresponding to data to be stored in the new set.

In an embodiment, the adding module 1102 is further configured to:

create a partition space list based on the partition space, the partition space list being configured to record, during a data rebalance process, at least one of information of the data range recorded in each partition space, the correspondence between the partition space and the set, a name of the each partition space, and correspondence between the partition space and the partition table.

In an embodiment, when configured to update the data range recorded in each partition space based on the partition plan, and determine a correspondence between each partition space and sets of the partition table by using the updated data range in each partition space, the updating module 1103 is specifically configured to:

determine a new data range of each set in the partition table based on the partition plan;

update, based on the new data range of each set, the data range recorded in the partition space corresponding to each set;

determine, based on the updated data range in each partition space, data of a to-be-changed set among the sets corresponding to each partition space, and create a new set for the data of the to-be-changed set among the sets; and determine a correspondence between the created set corresponding to the data of the to-be-changed set and the partition space, and determine a data range of the set corresponding to the data of the to-be-changed set.

In an embodiment, the sets are sorted based on the value range of the partition key or a key value; when configured to determine, based on the updated data range in each partition space, data of a to-be-changed set among the sets corresponding to each partition space, and create a new set for the data of the to-be-changed set among the sets, the updating module 1103 is specifically configured to:

perform following adjustment operations sequentially for each set contained in the partition table:

comparing the data range of data currently stored in the set with the data range recorded in the partition space corresponding to the set;

in a case that a maximum value of a partition key corresponding to the data range of the data currently stored in the set is greater than the maximum value of a partition key in the partition space recorded in the partition space corresponding to the set, determining first data of the to-be-changed set based on the maximum value of the partition key in the partition space corresponding to the set, and creating a new first set for the first data of the to-be-changed set in each set; and in a case that a minimum value of a partition key corresponding to the data range of the data currently stored in the set is less than the minimum value of a partition key in the partition space recorded in the partition space corresponding to the set, determining second data of the to-be-changed set based on the minimum value of the partition key in the partition space corresponding to the set, and creating a new second set for the second data of the to-be-changed set.

In an embodiment, when configured to determine the first data of the to-be-changed set based on the maximum value of the partition key in the partition space corresponding to the set, and create a new first set for the first data of the to-be-changed set, the updating module 1103 is specifically configured to:

mark a maximum split point in the set based on the maximum value of the partition key in the partition space corresponding to the set;

create the new first set for the first data of the to-be-changed set in each set; and establish an association between the set and the first set.

When configured to determine the second data of the to-be-changed set based on the minimum value of the partition key in the partition space corresponding to the set, and create a new second set for the second data of the to-be-changed set, the updating module 1103 is specifically configured to:

mark a minimum split point in the set based on the minimum value of the partition key in the partition space corresponding to the set;

create the new second set for the second data of the to-be-changed set in each set; and establish an association between the set and the second set.

In an embodiment, when configured to update data distribution in the sets of the partition table based on the correspondence, the distribution module 1104 is specifically configured to:

perform, based on the correspondence, following data movement operations for each set that needs data transfer:

moving the first data to a corresponding first set, the first data being a data corresponding to the partition key between a maximum value of the partition key recorded in the partition space corresponding to the partition space and the maximum value of the partition key corresponding to the data range of the data currently stored in the set;

moving the second data to a corresponding second set, the second data being a data corresponding to the partition key between a minimum value of the partition key corresponding to the data range of the data currently stored in the set and the minimum value of the partition key in the partition space corresponding to the set; and deleting a mark of the maximum split point, a mark of the minimum split point, and the associations.

In an embodiment, the apparatus 1100 further includes an online read and write module, and before completing the updating data distribution in the partition table, the online read and write module is configured to:

in response to a processing operation on target data, in a case of determining that a key value of the partition key corresponding to the target data is greater than the key value of the partition key corresponding to the maximum split point of any set or less than the key value of the partition key corresponding to the minimum split point of any set, query the target data in the set;

in a case that a storage location corresponding to the target data is obtained by querying, return a processing result for the target data; and in a case that the storage location is not found by querying, determine, based on the association corresponding to the set, the storage location corresponding to the target data in the first set or the second set corresponding to the set, and return the processing result for the target data.

The apparatus according to the embodiments of this disclosure may execute the method according to the embodiments of this disclosure, the implementation principle is similar. Actions executed by each module in the apparatus according to each embodiment of this disclosure may correspond to the steps in the method according to each embodiment of this disclosure. For the detailed functional description of each module of the apparatus, reference may be made to the description of the corresponding method shown above, and details are not repeated herein.

Blockchain referred to in this disclosure is a new application mode of computer technology such as distributed data storage, point-to-point transmission, consensus mechanism, and encryption algorithm. The blockchain, essentially a decentralized database, is a string of data blocks generated in association with a cryptographic method. Each data block includes a certain quantity of processed data, and is used to verify the validity (anti-counterfeiting) of the information and generate a next block. The blockchain may include a blockchain underlying platform, a platform product service layer, an application service layer, and the like.

An embodiment of this disclosure provides an electronic device, including a memory, at least one processor, and a computer program of executable computer instructions stored on the memory, the processor executing the computer program to achieve the various steps of the data processing method. Compared with the related art, the following can be achieved: this disclosure is implemented for partition table processing, and the partition table may include a physical table for data distribution based on a preset partition key; latest data rebalance information can be obtained, the data rebalance information being used for adjusting the data distribution of the partition table; based on this, at least one partition space can be added to the partition table, the partition space has a correspondence with a set in the partition table, and the partition space can be used for storing the data range of the corresponding set, where the data range includes the value range of the partition key or the value list of the partition key; in this case, the added partition space can decouple binding between the partition definition of the partition table and data storage of an actual set; furthermore, based on a predefined data range of at least one set in the data rebalance information, the correspondence between the current partition space and the set can be updated, and after the correspondence between the two is updated, the data distribution in the partition table can be updated based on the most recently obtained correspondence between the partition space and the set. Implementation of this disclosure can achieve data rebalance by adding partition spaces; in addition, the data rebalance of this disclosure does not require data synchronization of the full amount of data of the partition table, which is conducive to shortening execution time of data rebalance, improving efficiency of data processing, and reducing the occurrence of service congestion.

Figure 12:
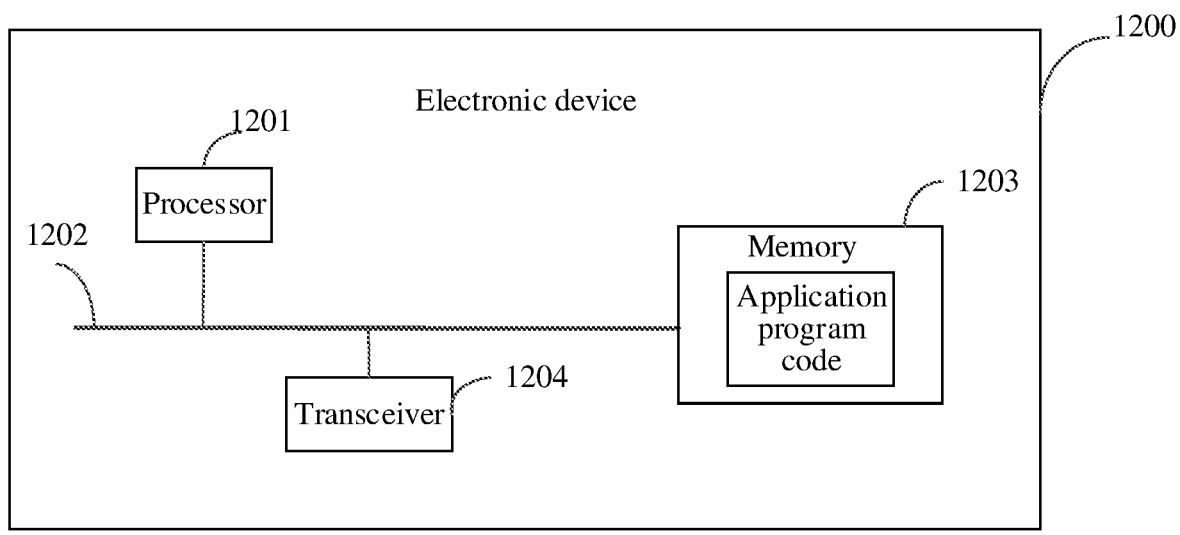
FIG. 12 is a schematic structural diagram of an electronic device according to an embodiment of this disclosure.

An electronic device is provided in an optional embodiment, as shown in FIG. 12. The electronic device 1200 shown in FIG. 12 includes: at least one processor 1201 and a memory 1203. The processor 1201 and the memory 1203 are connected to each, such as connected via bus 1202 or other communication means. Optionally, the electronic device 1200 may further include a transceiver 1204. The transceiver 1204 may be configured for data interaction between the electronic device and other electronic devices, such as transmission of data and/or reception of data. The transceiver 1204 is not limited to one in practical applications, and the structure of the electronic device 1200 does not limit the embodiments of this disclosure.

The processor 1201 may be a central processing unit (CPU), a general purpose processor, a digital signal processor (DSP), an application specific integrated circuit (ASIC), a field programmable gate array (FPGA), or another programmable logical device, a transistor logical device, a hardware component, or a combination thereof. The processor 1201 may implement or execute various example logical blocks, units, and circuits described with reference to content disclosed in this disclosure. The processor 1201 may also be a combination of processors implementing a computing function, for example, a combination of one or more microprocessors, or a combination of the DSP and a microprocessor.

The bus 1202 may include a path, for transmitting information between the foregoing components. The bus 1202 may be a peripheral component interconnect (PCI) bus, an extended industry standard architecture (EISA) bus, or the like. The bus 1202 may be classified into an address bus, a data bus, a control bus, and the like. For ease of representation, only one thick line is used to represent the bus in FIG. 12, but this does not mean that there is only one bus or only one type of bus.

The memory 1203 may be a read only memory (ROM) or other types of static storage devices that can store static information and instructions, an random access memory (RAM) or other types of dynamic storage devices that can store information and instructions, or an electrically Erasable programmable read only memory (EEPROM), a compact disc read only memory (CD-ROM) or other optical disk storage, optical disk storage (including compressed discs, laser discs, optical discs, digital universal discs, blu-ray discs, etc.), disk storage media, other magnetic storage devices, or any other media that can be configured to carry or store computer programs and can be read by a computer, and are not limited herein.

The memory 1203 is configured to store a computer program for executing the embodiments of this disclosure, and the execution is controlled by the processor 1201. The processor 1201 is configured to execute the computer program stored in the memory 1203 to implement the steps shown in the foregoing method embodiments.

The electronic device includes but is not limited to: a smart phone, a tablet, a laptop, a smart speaker, a smart watch, an intelligent voice interaction device, a vehicle terminal, and the like.

An embodiment of this disclosure provides a non-transitory computer-readable storage medium, having a computer program stored thereon, the computer program, when executed by a processor, implementing the steps and corresponding contents of the foregoing method embodiments.

An embodiment of this disclosure further provides a computer program product, including a computer program, the computer program, when executed by a processor, implementing the steps and corresponding contents of the foregoing method embodiments.

It is to be understood that, although the flowcharts of the embodiments of this disclosure indicates each operation step by an arrow, but the sequence of implementation of these steps is not limited to the sequence indicated by the arrows. Unless expressly stated herein, in some implementation scenarios of the embodiments of this disclosure, implementation steps in each flowchart may be executed in other sequence as required. In addition, some or all of the steps in each flowchart may include a plurality of sub-steps or a plurality of phases depending on actual implementation scenarios. Some or all of the sub-steps or phases may be executed at the same time, and each of the sub-steps or phases may be executed at different times. In scenarios where execution time is different, execution sequence of the sub-steps or phases can be flexibly configured according to requirements, and this is not limited in the embodiments of this disclosure.

The foregoing descriptions are merely some embodiments of this disclosure. For a person of ordinary skill in the art, without departing from the concept of the embodiments of this disclosure, the use of other similar implementations based on the technical ideas of this disclosure also fall within the protection scope of the embodiments of this disclosure.

What is claimed is:

1. A data processing method for an electronic device, comprising:
   obtaining data rebalance information representing a new partition plan for a partition table, the partition table being a table for data distribution based on a partition key;
   creating, for a set specified in the partition plan, a corresponding partition space, and recording, in the corresponding partition space, a current data range of a set corresponding to the partition space, the data range comprising one of a value range of the partition key and a value list of the partition key;
   updating the data range recorded in the corresponding partition space based on the partition plan, and updating correspondence between the corresponding partition space and sets of the partition table by using the updated data range in the corresponding partition space; and
   updating data distribution in the sets of the partition table based on the correspondence,
   wherein the updating the data range recorded in the corresponding partition space based on the partition plan, and updating correspondence between the corresponding partition space and sets of the partition table by using the updated data range in the corresponding partition space comprises:
      determining a new data range of the set in the partition table based on the partition plan;
      updating, based on the new data range of the set, the data range recorded in the partition space corresponding to the set;
      determining, based on the updated data range in the corresponding partition space, data of a to-be-changed set among the sets corresponding to the corresponding partition space, and creating a new set for the data of the to-be-changed set among the sets; and
      determining a correspondence between the created set corresponding to the data of the to-be-changed set and the partition space, and determining a data range of the set corresponding to the data of the to-be-changed set.

2. The method according to claim 1, wherein the creating, for a set specified in the partition plan, a corresponding partition space, and recording, in the corresponding partition space, a current data range of a set corresponding to the partition space further comprises:
   generating, for a current partition in the partition table, a corresponding partition space, and recording the data range of the partition in the partition space corresponding to the set; and
   creating a new set in a case that the partition plan indicates that a new set is to be created, generating, for the new partition, a corresponding partition space corresponding to the new set, and recording, in the partition space, a data range corresponding to data to be stored in the new set.

3. The method according to claim 1, further comprising:
   creating a partition space list based on the partition space, wherein, during a data rebalance process, the partition space list is configured to record at least one piece of information of: the data range recorded in the corresponding partition space, the correspondence between the partition space and the set, a name of the corresponding partition space, and a correspondence between the partition space and the partition table.

4. The method according to claim 1, wherein the sets in the partition table are sorted based on the value range of the partition key or a key value; and the determining, based on the updated data range in the corresponding partition space, data of a to-be-changed set among the sets corresponding to the corresponding partition space, and creating a new set for the data of the to-be-changed set among the sets further comprises:
   for the set contained in the partition table, performing:
   comparing the data range of data currently stored in the set with the data range recorded in the partition space corresponding to the set;
   in a case that a maximum value of a partition key corresponding to the data range of the data currently stored in the set is greater than the maximum value of a partition key in the partition space recorded in the partition space corresponding to the set, determining first data of the to-be-changed set based on the maximum value of the partition key in the partition space corresponding to the set, and creating a new first set for the first data of the to-be-changed set; and
   in a case that a minimum value of a partition key corresponding to the data range of the data currently stored in the set is less than the minimum value of a partition key in the partition space recorded in the partition space corresponding to the set, determining second data of the to-be-changed set based on the minimum value of the partition key in the partition space corresponding to the set, and creating a new second set for the second data of the to-be-changed set.

5. The method according to claim 4, wherein:
   the determining first data of the to-be-changed set based on the maximum value of the partition key in the partition space corresponding to the set, and creating a new first set for the first data of the to-be-changed set further comprises:
   marking a maximum split point in the set based on the maximum value of the partition key in the partition space corresponding to the set;
   creating the new first set for the first data of the to-be-changed set in the set; and
   establishing an association between the set and the first set, and
   the determining second data of the to-be-changed set based on the minimum value of the partition key in the partition space corresponding to the set, and creating a new second set for the second data of the to-be-changed set further comprises:
   marking a minimum split point in the set based on the minimum value of the partition key in the partition space corresponding to the set;
   creating the new second set for the second data of the to-be-changed set in the set; and
   establishing an association between the set and the second set.

6. The method according to claim 5, wherein the updating data distribution in the sets of the partition table based on the correspondence further comprises:
   based on the correspondence, for the set that needs data transfer, performing:
   moving the first data to a corresponding first set, the first data being a data corresponding to the partition key between a maximum value of the partition key recorded in the partition space corresponding to the partition space and the maximum value of the partition key corresponding to the data range of the data currently stored in the set;

moving the second data to a corresponding second set, the second data being a data corresponding to the partition key between a minimum value of the partition key corresponding to the data range of the data currently stored in the set and the minimum value of the partition key in the partition space corresponding to the set; and deleting a mark of the maximum split point, a mark of the minimum split point, and the associations.

7. The method according to claim 5, wherein, before completing the updating data distribution in the partition table, the method further comprises:

in response to a processing operation on target data, in a case of determining that a key value of the partition key corresponding to the target data is greater than the key value of the partition key corresponding to the maximum split point of any set or less than the key value of the partition key corresponding to the minimum split point of any set, querying the target data in the set;

in a case that a storage location corresponding to the target data is obtained by querying, returning a processing result for the target data; and in a case that the storage location is not found by querying, determining, based on the association corresponding to the set, the storage location corresponding to the target data in the first set or the second set corresponding to the set, and returning the processing result for the target data.

8. An electronic device for data processing, comprising:

a memory storing one or more computer programs having executable computer instructions; and at least one processor coupled to the memory and configured to execute the executable computer instructions to perform:

obtaining data rebalance information representing a new partition plan for a partition table, the partition table being a table for data distribution based on a partition key;

creating, for a set specified in the partition plan, a corresponding partition space, and recording, in the corresponding partition space, a current data range of a set corresponding to the partition space, the data range comprising one of a value range of the partition key and a value list of the partition key;

updating the data range recorded in the corresponding partition space based on the partition plan, and updating correspondence between the corresponding partition space and sets of the partition table by using the updated data range in the corresponding partition space; and updating data distribution in the sets of the partition table based on the correspondence, wherein the updating the data range recorded in the corresponding partition space based on the partition plan, and updating correspondence between the corresponding partition space and sets of the partition table by using the updated data range in the corresponding partition space comprises:

determining a new data range of the set in the partition table based on the partition plan;

updating, based on the new data range of the set, the data range recorded in the partition space corresponding to the set;

determining, based on the updated data range in the corresponding partition space, data of a to-be-changed set among the sets corresponding to the corresponding partition space, and creating a new set for the data of the to-be-changed set among the sets; and determining a correspondence between the created set corresponding to the data of the to-be-changed set and the partition space, and determining a data range of the set corresponding to the data of the to-be-changed set.

9. The electronic device according to claim 8, wherein the creating, for a set specified in the partition plan, a corresponding partition space, and recording, in the corresponding partition space, a current data range of a set corresponding to the partition space further comprises:

generating, for a current partition in the partition table, a corresponding partition space, and recording the data range of the partition in the partition space corresponding to the set; and creating a new set in a case that the partition plan indicates that a new set is to be created, generating, for the new partition, a corresponding partition space corresponding to the new set, and recording, in the partition space, a data range corresponding to data to be stored in the new set.

10. The electronic device according to claim 8, wherein the processor is further configured to perform:

creating a partition space list based on the partition space, wherein, during a data rebalance process, the partition space list is configured to record at least one piece of information of: the data range recorded in the corresponding partition space, the correspondence between the partition space and the set, a name of the corresponding partition space, and a correspondence between the partition space and the partition table.

11. The electronic device according to claim 8, wherein the sets in the partition table are sorted based on the value range of the partition key or a key value; and the determining, based on the updated data range in the corresponding partition space, data of a to-be-changed set among the sets corresponding to the corresponding partition space, and creating a new set for the data of the to-be-changed set among the sets further comprises:

for the set contained in the partition table, performing:

comparing the data range of data currently stored in the set with the data range recorded in the partition space corresponding to the set;

in a case that a maximum value of a partition key corresponding to the data range of the data currently stored in the set is greater than the maximum value of a partition key in the partition space recorded in the partition space corresponding to the set, determining first data of the to-be-changed set based on the maximum value of the partition key in the partition space corresponding to the set, and creating a new first set for the first data of the to-be-changed set; and in a case that a minimum value of a partition key corresponding to the data range of the data currently stored in the set is less than the minimum value of a partition key in the partition space recorded in the partition space corresponding to the set, determining second data of the to-be-changed set based on the minimum value of the partition key in the partition space corresponding to the set, and creating a new second set for the second data of the to-be-changed set.

12. The electronic device according to claim 11, wherein:

the determining first data of the to-be-changed set based on the maximum value of the partition key in the partition space corresponding to the set, and creating a new first set for the first data of the to-be-changed set further comprises:
marking a maximum split point in the set based on the maximum value of the partition key in the partition space corresponding to the set;
creating the new first set for the first data of the to-be-changed set in the set; and
establishing an association between the set and the first set, and
the determining second data of the to-be-changed set based on the minimum value of the partition key in the partition space corresponding to the set, and creating a new second set for the second data of the to-be-changed set further comprises:
marking a minimum split point in the set based on the minimum value of the partition key in the partition space corresponding to the set;
creating the new second set for the second data of the to-be-changed set in the set; and
establishing an association between the set and the second set.

13. A non-transitory computer-readable storage medium storing computer program instructions executable by at least one processor to perform:
obtaining data rebalance information representing a new partition plan for a partition table, the partition table being a table for data distribution based on a partition key;
creating, for a set specified in the partition plan, a corresponding partition space, and recording, in the corresponding partition space, a current data range of a set corresponding to the partition space, the data range comprising one of a value range of the partition key and a value list of the partition key;
updating the data range recorded in the corresponding partition space based on the partition plan, and updating correspondence between the corresponding partition space and sets of the partition table by using the updated data range in the corresponding partition space; and
updating data distribution in the sets of the partition table based on the correspondence,
wherein the updating the data range recorded in the corresponding partition space based on the partition plan, and updating correspondence between the corresponding partition space and sets of the partition table by using the updated data range in the corresponding partition space comprises:
determining a new data range of the set in the partition table based on the partition plan;
updating, based on the new data range of the set, the data range recorded in the partition space corresponding to the set:
determining, based on the updated data range in the corresponding partition space, data of a to-be-changed set among the sets corresponding to the corresponding partition space, and creating a new set for the data of the to-be-changed set among the sets; and
determining a correspondence between the created set corresponding to the data of the to-be-changed set and the partition space, and determining a data range of the set corresponding to the data of the to-be-changed set.

14. The non-transitory computer-readable storage medium according to claim 13, wherein the creating, for the set specified in the partition plan, a corresponding partition space, and recording, in the corresponding partition space, a current data range of a set corresponding to the partition space further comprises:
generating, for a current partition in the partition table, a corresponding partition space, and recording the data range of the partition in the partition space corresponding to the set; and
creating a new set in a case that the partition plan indicates that a new set is to be created, generating, for the new partition, a corresponding partition space corresponding to the new set, and recording, in the partition space, a data range corresponding to data to be stored in the new set.

15. The non-transitory computer-readable storage medium according to claim 13, wherein the processor further performs:
creating a partition space list based on the partition space, wherein, during a data rebalance process, the partition space list is configured to record at least one piece of information of: the data range recorded in the corresponding partition space, the correspondence between the partition space and the set, a name of the corresponding partition space, and a correspondence between the partition space and the partition table.

16. The non-transitory computer-readable storage medium according to claim 13, wherein the sets in the partition table are sorted based on the value range of the partition key or a key value; and the determining, based on the updated data range in the corresponding partition space, data of a to-be-changed set among the sets corresponding to the corresponding partition space, and creating a new set for the data of the to-be-changed set among the sets further comprises:
for the set contained in the partition table, performing:
comparing the data range of data currently stored in the set with the data range recorded in the partition space corresponding to the set;
in a case that a maximum value of a partition key corresponding to the data range of the data currently stored in the set is greater than the maximum value of a partition key in the partition space recorded in the partition space corresponding to the set, determining first data of the to-be-changed set based on the maximum value of the partition key in the partition space corresponding to the set, and creating a new first set for the first data of the to-be-changed set; and
in a case that a minimum value of a partition key corresponding to the data range of the data currently stored in the set is less than the minimum value of a partition key in the partition space recorded in the partition space corresponding to the set, determining second data of the to-be-changed set based on the minimum value of the partition key in the partition space corresponding to the set, and creating a new second set for the second data of the to-be- changed set.

17. The non-transitory computer-readable storage medium according to claim 16, wherein:
the determining first data of the to-be-changed set based on the maximum value of the partition key in the partition space corresponding to the set, and creating a new first set for the first data of the to-be-changed set further comprises:
marking a maximum split point in the set based on the maximum value of the partition key in the partition space corresponding to the set;

creating the new first set for the first data of the to-be-changed set in the set; and establishing an association between the set and the first set, and the determining second data of the to-be-changed set based on the minimum value of the partition key in the partition space corresponding to the set, and creating a new second set for the second data of the to-be-changed set further comprises:

marking a minimum split point in the set based on the minimum value of the partition key in the partition space corresponding to the set;

creating the new second set for the second data of the to-be-changed set in the set; and establishing an association between the set and the second set.

* * * * *